US010362536B2

(12) United States Patent
Mathews et al.

(10) Patent No.: US 10,362,536 B2
(45) Date of Patent: Jul. 23, 2019

(54) DYNAMIC CONNECTION PATH DETECTION AND SELECTION FOR WIRELESS CONTROLLERS AND ACCESSORIES

(71) Applicant: Apple Inc., Cupertino, CA (US)

(72) Inventors: Dennis Mathews, Pleasanton, CA (US);
Craig Dooley, Los Gatos, CA (US);
Anjali S. Sandesara, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/033,073

(22) Filed: Jul. 11, 2018

(65) Prior Publication Data

US 2019/0014539 A1 Jan. 10, 2019

Related U.S. Application Data

(63) Continuation of application No. 15/274,437, filed on Sep. 23, 2016, now Pat. No. 10,206,170.
(Continued)

(51) Int. Cl.
*H04W 52/02* (2009.01)
*H04M 1/725* (2006.01)

(52) U.S. Cl.
CPC ..... *H04W 52/0216* (2013.01); *H04M 1/7253* (2013.01); *Y02D 70/00* (2018.01);
(Continued)

(58) Field of Classification Search
None
See application file for complete search history.

(56) References Cited

U.S. PATENT DOCUMENTS 5,059,871 A 10/1991 Pearlman et al.
5,086,385 A 2/1992 Launey et al.
(Continued)

FOREIGN PATENT DOCUMENTS

CN 101527911 A 9/2009
CN 102387501 A 3/2012
(Continued)

OTHER PUBLICATIONS

Bekkelien, Anja, "Bluetooth Indoor Positioning." Master of Computer Science, University of Geneva. Mar. 2012. 56 pages.
(Continued)

*Primary Examiner* — Mohammed Rachedine
(74) *Attorney, Agent, or Firm* — Kilpatrick, Townsend & Stockton

(57) ABSTRACT

Controllers can communicate with accessories using various paths, such as a wireless communication path. A controller can maintain reachability information for each accessory indicating the path(s) via which the accessory is currently reachable. Maintaining the reachability information can include scanning to detect broadcasts from the accessories and updating the reachability information based on the results of scanning. Scanning parameters such as scan interval and scan duration can be selected dynamically based on the current operating context of the controller (e.g., where the controller is located, what processes are active on the controller, what other devices have been detected within communication range of the controller).

20 Claims, 9 Drawing Sheets

US 10,362,536 B2

Page 2

Related U.S. Application Data

(60) Provisional application No. 62/276,810, filed on Jan. 8, 2016.

(52) U.S. Cl.
CPC ........ *Y02D 70/1262* (2018.01); *Y02D 70/142* (2018.01); *Y02D 70/144* (2018.01); *Y02D 70/164* (2018.01); *Y02D 70/166* (2018.01); *Y02D 70/22* (2018.01); *Y02D 70/26* (2018.01)

(56) References Cited

U.S. PATENT DOCUMENTS

| | | |
|---|---|---|
| 5,471,190 A | 11/1995 | Zimmermann |
| 5,621,662 A | 4/1997 | Humphries et al. |
| 5,907,279 A | 5/1999 | Bruins et al. |
| 6,150,921 A | 11/2000 | Werb et al. |
| 6,249,680 B1 | 6/2001 | Wax et al. |
| 6,631,271 B1 | 10/2003 | Logan |
| 6,756,998 B1 | 6/2004 | Bilger |
| 6,912,429 B1 | 6/2005 | Bilger |
| 6,996,402 B2 | 2/2006 | Logan et al. |
| 7,047,092 B2 | 5/2006 | Wimsatt |
| 7,394,393 B2 | 7/2008 | Zhang et al. |
| 7,574,417 B1 | 8/2009 | McGreevy et al. |
| 8,042,048 B2 | 10/2011 | Wilson et al. |
| 8,156,334 B2 | 4/2012 | Ho |
| 8,261,089 B2 | 9/2012 | Cobos et al. |
| 8,375,118 B2 | 2/2013 | Hao et al. |
| 8,516,087 B2 | 8/2013 | Wilson et al. |
| 8,670,749 B2 | 3/2014 | Pratt, Jr. et al. |
| 8,671,099 B2 | 3/2014 | Kapoor et al. |
| 8,700,060 B2 | 4/2014 | Huang |
| 8,737,917 B2 | 5/2014 | Desai et al. |
| 8,750,797 B2 | 6/2014 | Ketari |
| 9,544,075 B2 | 1/2017 | Altman et al. |
| 9,549,375 B2 | 1/2017 | Dooley et al. |
| 2002/0095568 A1 | 7/2002 | Norris et al. |
| 2002/0180581 A1 | 12/2002 | Kamiwada et al. |
| 2003/0067386 A1* | 4/2003 | Skinner ............... G08B 25/006 340/540 |
| 2004/0023640 A1 | 2/2004 | Ballai |
| 2004/0260407 A1 | 12/2004 | Wimsatt |
| 2008/0009324 A1 | 1/2008 | Patel |
| 2008/0222711 A1 | 9/2008 | Michaelis |
| 2008/0229402 A1 | 9/2008 | Smetters et al. |
| 2008/0238661 A1 | 10/2008 | Camp et al. |
| 2009/0222659 A1 | 9/2009 | Miyabayashi et al. |
| 2009/0307255 A1 | 12/2009 | Park |
| 2009/0326800 A1 | 12/2009 | Kalaboukis et al. |
| 2010/0019920 A1 | 1/2010 | Ketari |
| 2010/0091818 A1 | 4/2010 | Sen et al. |
| 2010/0188279 A1 | 7/2010 | Shamilian et al. |
| 2010/0262829 A1 | 10/2010 | Brown et al. |
| 2011/0021142 A1 | 1/2011 | Desai |
| 2011/0153279 A1 | 6/2011 | Zhang et al. |
| 2012/0054493 A1 | 3/2012 | Bradley |
| 2012/0309410 A1 | 12/2012 | Marti et al. |
| 2012/0324124 A1 | 12/2012 | Locker et al. |
| 2013/0029596 A1 | 1/2013 | Preston et al. |
| 2013/0034230 A1 | 2/2013 | Takahashi |
| 2013/0090061 A1 | 4/2013 | Linde |
| 2013/0101121 A1 | 4/2013 | Nordholt et al. |
| 2013/0169407 A1 | 7/2013 | Chen et al. |
| 2013/0198516 A1 | 8/2013 | Fenton et al. |
| 2013/0217333 A1 | 8/2013 | Sprigg et al. |
| 2013/0225132 A1 | 8/2013 | Payan et al. |
| 2014/0006587 A1 | 1/2014 | Kusano |
| 2014/0022061 A1 | 1/2014 | Apte et al. |
| 2014/0085093 A1 | 3/2014 | Mittleman et al. |
| 2014/0113558 A1 | 4/2014 | Varoglu et al. |
| 2014/0118148 A1 | 5/2014 | Edlund et al. |
| 2014/0143695 A1 | 5/2014 | Sundermeyer et al. |
| 2014/0171114 A1 | 6/2014 | Marti et al. |
| 2014/0187200 A1 | 7/2014 | Reitter et al. |
| 2014/0210616 A1 | 7/2014 | Ramachandran |
| 2014/0222954 A1 | 8/2014 | Vaccari et al. |
| 2014/0321297 A1 | 10/2014 | Yee et al. |
| 2014/0364149 A1 | 12/2014 | Marti et al. |
| 2015/0237071 A1 | 8/2015 | Maher et al. |
| 2015/0334516 A1 | 11/2015 | Shon et al. |
| 2015/0350828 A1 | 12/2015 | Marti et al. |
| 2015/0351038 A1 | 12/2015 | Dooley et al. |
| 2016/0092469 A1* | 3/2016 | Mukherjee ............ G06Q 10/10 705/325 |
| 2016/0360526 A1 | 12/2016 | Lehmann et al. |
| 2017/0134171 A1* | 5/2017 | Woxland ............... H04L 9/3263 |

FOREIGN PATENT DOCUMENTS

| | | |
|---|---|---|
| CN | 106462123 A | 2/2017 |
| EP | 1125414A0 A2 | 8/2001 |
| EP | 1133120 A2 | 12/2001 |
| EP | 1381201 A2 | 1/2004 |
| EP | 1659739 A2 | 11/2005 |
| EP | 2148308 A2 | 1/2010 |
| EP | 2881676 A1 | 7/2013 |
| EP | 2784986 A1 | 11/2013 |
| GB | 2339367 A | 1/2000 |
| JP | 2004-236215 | 8/2004 |
| JP | 2009212732 A | 9/2009 |
| JP | 5474238 B1 | 4/2014 |
| TW | 200937931 A | 9/2009 |
| TW | 201250481 A | 12/2012 |
| WO | 2013/049007 A1 | 4/2013 |
| WO | 2013/174540 A1 | 11/2013 |
| WO | 2013/184108 A1 | 12/2013 |
| WO | 2014/004133 A1 | 1/2014 |
| WO | 2014/020880 A1 | 6/2014 |

OTHER PUBLICATIONS

Agrawal, Rohit et al., "Bluetooth Navigation System using Wi-Fi Access Poinst." School of Electronics Engineering, VIT University, Vellore. Downloaded from http://arxiv.org/pdf/pdf/1204.1748.pdf. 2011. 8 pages.

La Delfa, Gaetano Carmelo, "Accurate Indoor Navigation using Smartphone, Bluetooth Low Energy and Visual Tags." Department of Electrical, Electronics and Computer Engineering (DIEEI) University of Catania, Italy. Downloaded from http://mobmed.org/download/proceedings2014/mobileMed2014_paper_6. 2014. 4 pages.

Accuware, "Accuware Indoor Navigation." Downloaded from www.accuware.com. Copyright 2015. 3 pages.

Infsoft, "Indoor Navigation and Indoor Positioning using Bluetooth." 2015 Blog. Downloaded (Feb. 14, 2016) http://www.infsoft.com/blog/2015/indoor-navigation-and-indoor-positioning-using-bluetooth . . . 2 pages.

Posted by Alexandra (http://indoo.rs/author/alexandra/), "Bluetooth Low Energy Solution Released," "Accurate real-time Indoor Localization." Nov. 27, 2015. 3 pages.

"The Next Big Thing—Indoor Location Beacon Tag & Solutions." The Features N Benefits. Downloaded Feb. 16, 2016 https://www.sticknfind.com/indoornavigation.aspx. 5 pages.

Tarkoma, Sasu et al., "Smartphone Energy Consumption." Cambridge University Press, first published in 2014. 7 pages.

Navizon, "Navizon Indoor Triangulation System (I.T.S.)." Downloaded from www.navizon.com. Copyright 2015. 2 pages.

Dao, Trung-Kien et al., "Home Appliance Control System Based on Robust Indoor User Localization using Wifi Signals." Intl. Jrn. On Human Machine Interaction, vol. 1; issue 1; 2013. 10 pages.

Han, Bo et al., "On the Energy Efficiency of Device Discovery in Mobile Opportunistic Networks: A Systematic Approach." IEEE Transactions on Mobile Computing. 14 pages. Jun. 23, 2015. 14 pages.

Insoft Gmbl-I, "Indoor Navigation and Indoor Positioning Using Bluetooth." Downloaded from http://www.insoft.com/blog/2015/indoor-navigation-and-indoor-positioning-using-bluetooth . . . On Feb. 14, 2016. 2 pages.

U.S. Appl. No. 15/407,962, filed Jan. 17, 2017.

(56) References Cited

OTHER PUBLICATIONS

Epson 802.11 n/Biuetooth 2.1 Wireless Interfaces, Datasheet, Epson America, Inc., 2013, 2 pages.
Japanese Office Action dated Mar. 21, 2017 in Japanese Patent Application No. 2016-549775. 11 pages. (includes English translation of claims).
Office Action and Search Report dated Mar. 17, 2017 in ROC (Taiwan) Patent Application No. 10410409. 4 pages (includes English translation of non-compliant subject matter or essential features in Claim—Rule 18.2).
Fibaro, "Home Intelligence Advance User's Guide." 8.V111.2012 ver. 1.02\beta. Aug. 14, 2012. 102 pages.
Honeywell, "Tuxedo Touch WiFi Home Automation System Installation and Setup Guide." Aug. 4, 2012. 49 pages.
Non-Final Office Action dated Jun. 2, 2017 in U.S. Appl. No. 14/725,912. 18 pages.
Notice of Decision to Grant dated Jun. 5, 2017 in JP2016-549775. 10 pages. (English translation of allowed claims provided).
Skelton, "Fibaro Z-Wave Home Center 2 Mega Review." Sep. 10, 2012. 37 pages.
Behrang Fouladi, "Security Evaluation of the Z-Wave Wireless Protocol." Oct. 5, 2012. 7 pages.
Non-Final Office Action dated Apr. 19, 2017 in U.S. Appl. No. 15/274,437. 20 pages.
Final Office Action dated Nov. 30, 2017 in U.S. Appl. No. 15/274,437. 21 pages.
Notice of Allowance dated Apr. 16, 2018 in U.S. Appl. No. 15/274,437. 8 pages.
Anderson, Mats, "Use Case Possibilities with Bluetooth Low Energy in IoT Applications." White paper. www.u-blox.com May 20, 2015. 16 pages.
Asensio, Angel et al., "Protocol and Acrchitecture to Bring Things into Internet of Things." Research Article, Hindawi Publishing Corporation, International Journal of Distributed Sensor Networks. vol. 2014, Article ID 158252. Aug. 13, 2014. 19 pages.
Apple Inc., "Bonjour Overview." May 23, 2016. 32 pages.
Echevarria, Juan Jose et al., "Web Browsing into Sensor Tags Over NFC." Sensors 2012, 12, 8675-8690; doi:10.3390/s120708675. 16 pages.
Epson, "Connet-It Wireless Interface Modules." 802.11n/Bluetooth 2.1 Wireless Interfaces. Sep. 5, 2017. 2 pages.
Fielding, Roy T. et al., "Principled Design of the Modern Web Architecture." ACM Transactions on Internet Technology. vol. 2, No. 2. 1 page. May 2002.
Gatt, "Specifications/Characteristics Bluetooth Development Portal." 2 pages (best available copy). Retrieved Apr. 24, 2015 from http://developer.
Gatt, "Descriptors/Bluetooth Development Portal." 1 page. Retrieved Apr. 24, 2015 from http://developer.
Gatt, "Profiles/Bluetooth Development Portal." 1 page. Retrieved Apr. 24, 2015 from http://developer.
Gatt, "Services/Bluetooth Development Portal." 1 page. Retrieved Apr. 24, 2015 from http://developer.
GATT, "Bluetooth GATT/Specifications/Bluetooth Development Portal." 1 page. Retrieved Apr. 24, 2015 from http://developer.
Townsend, Kevin, "Introduction to Bluetooth Low Energy." Adafruit Learning System. Last updated Apr. 17, 2014. 11 pages.
Isomaki, Markus et al., "On Interworking Between Rapidly Evolving Internet of Things and Open Web Platform." Downloaded from http://www.w3.org/2014/02/20. Feb. 20, 2014. 5 pages.
Koch, Ed et al., "Hardware/Software Solution Unifying DALI, IBECS, and BACnet." Lawrence Berkeley National Laboratory. 2004. 25 pages.
Rosenberg, J., "A Data Model for Presence." The Internet Society. 35 pages. Jul. 2006.
Shelby Z. et al., "The Constrained Application Protocol (CoAP)." Internet Engineering Task Force (IETF). Jun. 2014. 112 pages.
Wikipedia, "Bluetooth Low Energy." Retrieved Apr. 24, 2015 from http://en.wikipedia.org/wiki/Bluetooth_low_energy. 9 pages.
Wu, Thomas, "The Secure Remote Password Protocol." Computer Science Department, Stanford University. Nov. 11, 1997. 17 pages.
Wikipedia, "Biuetooth Low Energy." Apr. 24, 2015. 1 page.

\* cited by examiner

DYNAMIC CONNECTION PATH DETECTION AND SELECTION FOR WIRELESS CONTROLLERS AND ACCESSORIES

CROSS-REFERENCES TO RELATED APPLICATIONS

This application is a continuation of U.S. application Ser. No. 15/274,437, filed Sep. 23, 2016 which claims the benefit of U.S. Provisional Application No. 62/276,810, filed Jan. 8, 2016, the disclosures of which are incorporated herein by reference in their entirety.

This disclosure is related to the following U.S. patent applications: application Ser. No. 14/614,914 filed Feb. 5, 2015; application Ser. No. 14/725,891 filed May 29, 2015; application Ser. No. 14/725,912 filed May 29, 2015; and application Ser. No. 15/064,406 filed Mar. 8, 2016. The disclosures of these applications are incorporated by reference herein in their entirety.

BACKGROUND

The present disclosure relates generally to wireless communication between controller devices and accessories and more particularly to dynamic connection management for wireless accessories.

Electronic devices are becoming increasingly popular in a range of applications. Mobile phones, tablet computers, home entertainment systems, and the like are just some of the electronic devices users interact with regularly.

Another category of electronic devices that is becoming more popular includes various electronically controllable "accessory" devices, such as thermostats, lighting devices, household appliances, etc. Users want to control these devices easily and conveniently using mobile devices and the like as controllers. For this reason (among others), it may be desirable for a mobile device to communicate wirelessly with accessories.

SUMMARY

Maintaining a connection on a wireless communication channel typically consumes power from both endpoint devices (e.g., a controller device and an accessory). To reduce power consumption, it may be desirable not to continuously maintain a communication channel when the controller device is not actively controlling the accessory. However, if a user attempts to use a controller to operate an accessory at a time when no communication channel is established, user-perceptible delay in executing user instructions may occur while the controller attempts to establish a connection. Such delay can be annoying and frustrating to the user.

Certain embodiments of the present invention relate to dynamic connection management for controllers connecting to accessory devices. In some embodiments, a controller can maintain reachability information for each accessory in a set of accessories of interest, with the reachability information indicating the path(s) via which the accessory is currently reachable. Maintaining the reachability information can include scanning on a wireless communication channel to detect broadcasts from the accessories and updating the reachability information based on the results of scanning. Scanning parameters such as scan interval and scan duration can be selected dynamically based on the current operating context of the controller (e.g., where the controller is located, what processes are active on the controller, what other devices have been detected in communication range of the controller). Various techniques described herein may reduce power consumption while avoiding excessive delay in responding to user instructions by allowing connections to be established quickly. In various embodiments, different strategies or combinations thereof may be employed. For purposes of illustration, the present description makes specific reference to systems in which an accessory and a controller can communicate using a wireless communication channel conforming to Bluetooth LE standards; however, it is to be understood that similar techniques may be applied in the context of other wireless communication channels.

In some embodiments, a connection (or communication channel) is established when needed and closed when not needed. Time can be consumed in just establishing the connection. For example, in the case of a Bluetooth LE channel, establishing a connection may involve one device (e.g., an accessory) advertising its availability, e.g., by broadcasting an advertisement signal on a designated channel or channels, then listening for a response; concurrently, a second device (e.g., a controller) can perform a scanning procedure to detect the advertisement. If the second device sends a responds while the first device is listening, a connection can be established and communication can occur. However, because both advertising and scanning are performed in bursts, a connection can be established only if the accessory broadcasts its advertisement at a time when the controller is listening. Depending on how frequently the accessory advertises and how frequently the controller listens, several seconds may be consumed just waiting for the controller to detect the advertisement. Thus, frequent scanning at a high duty cycle might seem desirable; however, high-duty-cycle scanning can rapidly drain the battery of a battery-powered controller and therefore is less than ideal.

Accordingly, certain strategies described herein can allow a controller to dynamically modify its scanning behavior to reduce power consumption while also reducing the likelihood of significant delay in connecting to an accessory. For example, the controller can dynamically modify its scanning behavior based on status information about the controller, such as whether an application program operable to control a set of accessories (referred to as "controller app") is in a foreground state or background state or whether the controller is operating in a reduced-power (e.g., sleep) state. In some embodiments, when the controller app is brought to the foreground, the duty cycle of the scanning process can be increased, in expectation that the user will use the app to issue instructions to accessories. When the controller app is in the background, it may be less likely that the user is about to start issuing instructions to accessories, and the duty cycle of the scanning process can be reduced. When the controller (or an applications processor or other component of the controller) enters a sleep state, the duty cycle can be reduced still further.

In some embodiments, the controller can have a communications coprocessor (e.g., including RF transceiver and processing circuitry) that is operable while an applications processor of the controller that executes the controller app is in a sleep state. The communications coprocessor can perform scanning operations and execute filter instructions provided by application programs (including the controller app). Based on the filter instructions, the communications coprocessor can determine whether to wake the applications processor and/or notify the controller app. The filter instructions provided by the controller app (or other application programs) can define criteria or conditions corresponding to events of interest, such as when a new controllable accessory is detected in a scan, when content of an advertisement from a previously detected controllable accessory changes (which may indicate that the state or configuration of the accessory has changed), or when a controllable accessory that had been visible during scanning ceases to be detected. If the coprocessor detects any of these events, it can wake the main applications processor (if it is asleep) and send a notification to the controller app, which can act on the notification. For instance, if a new controllable accessory is detected, the controller app can determine whether the new accessory's availability should be tracked (e.g., by scanning for it). If an accessory ceases to be detected during scanning, the controller app can determine whether to scan for the accessory at a higher duty cycle or take other action (e.g., flagging the accessory as unreachable via the wireless communication channel). In some embodiments, the determination whether to scan at a higher duty cycle can be based on a computation of a probability score indicating the likelihood that the accessory in question is currently in communication range for the protocol being used. The probability score can be based, e.g., on geolocation information indicating a location of the controller and/or information identifying other devices that are currently visible in a wireless scan. In some embodiments, the controller can use information correlating the visibility of the accessory in question with visibility of one or more other devices, e.g., by defining clusters of devices that tend to be concurrently visible. The probability score can be based at least in part on whether other devices in the same cluster as the accessory in question are currently visible. In some embodiments, the probability score an also be based at least in part on a simulation algorithm. The simulation algorithm can operate on a set of inputs that can include, e.g., scan parameters to be used in scanning, information about the advertising interval and duration of accessory advertisements (which can be sourced from a previously detected advertisement), and a time when a previous advertisement from the accessory was generated. Based on these inputs, the scanning algorithm can provide an output indicating a probability of detecting at least one advertisement from the accessory within a given time period. Other techniques can also be used. In some embodiments, if the probability score is below a threshold, the controller can assume that the accessory is not reachable on the wireless channel and avoid the time and energy expenditures associated with scanning.

Certain strategies described herein can allow a controller to store and maintain "reachability" information for various controllable accessories. For instance, in some embodiments, a given accessory may be potentially reachable via multiple different communication paths, such as a "direct," or point-to-point, wireless communication path (e.g., Bluetooth LE), a "tunnel" path (e.g., communicating via a wireless LAN or other channel with an intermediary device, also referred to as a tunnel, that has a direct path to the accessory), or a "remote" path (e.g., communicating with the accessory via a wide area network using a secure message relay service or the like). Where multiple possible paths are potentially available, the controller can benefit from decision logic that enables fast decisions as to which path to try in a given case. In some embodiments, a controller can update an accessory's reachability information for a direct path based on results of scanning operations. Reachability information for other paths can be maintained as well. For instance, reachability for a tunnel path can be determined based on whether the controller is connected to (or able to connect to) the tunnel on the wireless LAN; reachability for a remote path can be determined based on whether the controller can connect to a wide area network and whether the accessory has previously been connected to the wide area network. When a controller determines that a connection to a particular accessory should be established, the controller can select a connection path by applying decision logic to the stored reachability information for that accessory. For example, the decision logic can specify a priority order among the possible paths, with the highest priority path being selected. In some cases, the priority order can be determined dynamically. For instance, if a direct path and a tunnel path are both available, the selection may depend on the signal strength of the direct path. Other decision logic and criteria can be substituted. The controller can attempt to connect using the selected path and can fall back to an alternative path if the connection attempt fails.

These and/or other techniques can be used in various combinations. For instance, dynamic scanning can be used to maintain reachability data by scanning for accessories on an ongoing basis, without necessarily attempting to connect to any detected accessory. The reachability data for a given accessory can indicate which channels are currently capable of providing a connection to the accessory and may include signal strength information for some or all of the channels. When the controller determines that a connection should be made, the controller can use the reachability data to determine whether the direct wireless channel or an alternative channel should be used. This can save time, e.g., if the accessory that happens to be out of range or otherwise unable to connect on the wireless channel.

The following description will provide a further understanding of the nature and advantages of the claimed invention.

DETAILED DESCRIPTION

Example Environment

Embodiments of the present invention can be incorporated in a number of contexts. One such context is an automated environment, where a number of accessory devices have been deployed that can be controlled using various controller devices (including but not limited to smart phones). A controller device can provide a user interface that allows a user to operate the accessory devices by providing input to the controller device; the controller device can respond to the input by sending messages to one or more accessory devices. In some embodiments, a controller device may execute program code that automates accessory control, in which case the controller device may send messages to one or more accessory devices in response to instructions in the program code, without requiring user input.

Figure 1:
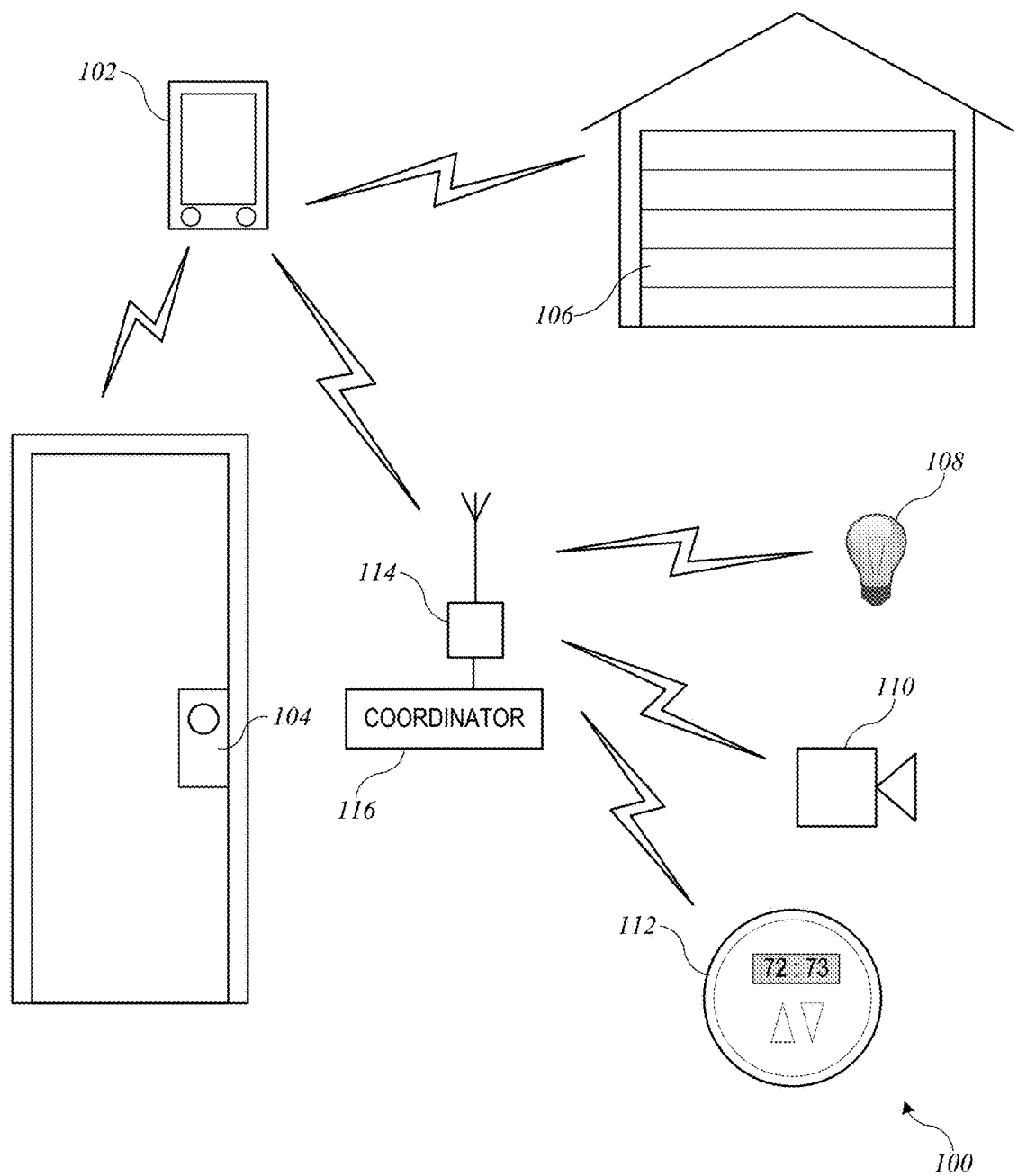
FIG. 1 shows a home environment according to an embodiment of the present invention.

FIG. 1 shows a home environment 100 according to an embodiment of the present invention. Home environment 100, which is an example of an automated environment, includes a controller device (or "controller") 102 that can communicate with various accessory devices (also referred to as "accessories") located in the environment. Controller 102 can include, for example, a desktop computer, laptop computer, tablet computer, smart phone, wearable computing device, personal digital assistant, or any other computing device or set of devices that is capable of communicating command-and-control messages to accessories (e.g., as described in above-referenced U.S. application Ser. No. 14/614,914) and presenting a user interface to allow a user to indicate desired operations on the accessories. In some embodiments, controller 102 can be implemented using multiple discrete devices. For example, there can be a base station that communicates with accessories and that can be installed in a fixed location in environment 100, and one or more mobile remote-control stations (e.g., a handheld or wearable device such as a mobile phone, tablet computer, smart watch, eyeglasses, etc.) that provide a user interface and communicate with the base station to effect control over accessories. In some embodiments, the base station can function as a coordinator or tunnel as described below.

Any type of accessory device can be controlled. Examples of accessory devices include door lock 104, garage door system 106, light fixture 108, security camera 110, and thermostat 112. In some instances, controller 102 can communicate directly with an accessory; for instance, controller 102 is shown communicating directly with door lock 104 and garage door system 106. In other instances, controller 102 can communicate via an intermediary. For instance, controller 102 is shown communicating via a wireless network access point 114 with accessories 108, 110, 112 that are on a wireless network provided by access point 114. As noted above, in some embodiments, controller 102 can include a base station, and base station functionality can be integrated into access point 114 or into one of the accessories that is to be controlled (e.g., thermostat 112). Another type of intermediary can be coordinator 116, which can relay messages from a controller to an accessory and can also implement various control logic to automate or optimize interactions with accessories.

Various communication transports and combinations of transports can be used, and different transports can be used with different devices. For example, some wireless transports such as the Bluetooth® Classic or Bluetooth® Smart (or Low Energy) communication protocol and standards promulgated by the Bluetooth SIG (referred to herein as "Bluetooth" and "Bluetooth LE") can support direct point-to-point communication between devices within a limited range. Other wireless transports such as a wireless network complying with Wi-Fi® networking standards and protocols promulgated by the Wi-Fi Alliance (referred to herein as a "Wi-Fi network") can define a wireless network with a central access point that routes communications between different devices on the network. Further, while wireless communication transports are shown, wired transports can also be provided for some or all of the accessories. For example, light bulb 108 can be connected to access point 114 by a wired connection, and controller 102 can communicate with light bulb 108 by sending messages wirelessly to access point 114, which can deliver the messages to light bulb 108 via the wired connection. As another example, coordinator 116 can be connected to access point 114 by a wired connection as shown (this connection can be wireless if desired), and controller 102 can communicate with accessories such as light bulb 108 by sending messages to coordinator 116 via access point 114; coordinator 116 can communicate with light bulb 108, either via access point 114 or via another channel such as a Bluetooth LE channel. Other combinations of wired and wireless communication are also possible. In some cases controller 102 may have multiple possible paths for communicating with a particular accessory, including direct and/or indirect paths; examples are described below.

Further, while one controller 102 is shown, a home environment can have multiple controller devices. For example, each person who lives in the home may have his or her own mobile device (or devices) that can act as a controller for some or all of accessories 104-112. Different controller devices can be configured to communicate with different subsets of the accessories; for example, a child's controller might be blocked from modifying settings on thermostat 112, while a parent's controller device is permitted to modify the settings. Such permissions or privileged can be configured and controlled, for example, using techniques described in above-referenced U.S. application Ser. No. 14/725,891.

In some embodiments, a uniform accessory protocol ("UAP") can facilitate communication by a controller 102 with one or more accessories 104-112. The protocol can provide a simple and extensible framework that models an accessory as a collection of services, with each service being defined as a set of characteristics, each of which has a defined value at any given time. Various characteristics can represent various aspects of the accessory's state. For example, in the case of thermostat 112, characteristics can include power (on or off), current temperature, and target temperature. The set of services and characteristics of an accessory can be represented as an attribute database for the accessory, and the accessory can expose all or part of the attribute database to a given controller. In some embodiments, the format in which an attribute database is presented to and/or accessed by a controller may be transport-dependent while conforming to the same underlying accessory model. Examples of accessory models based on services and characteristics are described in above-referenced U.S. application Ser. No. 14/614,914.

The protocol can further define message formats for controller 102 to send command-and-control messages (requests) to accessory 112 (or other accessories) and for accessory 112 to send response messages to controller 102. The command-and-control messages can allow controller 102 to interrogate the current state of accessory characteristics and in some instances to modify the characteristics (e.g., modifying the power characteristic can turn an accessory off or on). Accordingly, any type of accessory, regardless of function or manufacturer, can be controlled by sending appropriate messages. The message format can be uniform across accessories. Examples of message formats are described in above-referenced U.S. application Ser. No. 14/614,914. In some embodiments, the message format may be transport-dependent, e.g., depending on how the attribute database is represented for a particular transport. For instance, in the case of a Bluetooth LE transport, the attribute database format can leverage the generic attribute (GATT) profile as defined in Bluetooth LE specifications; in the case of a transport based on the Internet Protocol (IP) suite (e.g., a Wi-Fi transport), the attribute database can be represented using a notation such as JSON (JavaScript Object Notation); JSON objects representing all or part of the attribute database can be communicated between the accessory and the controller using protocols such as HTTP.

The uniform accessory protocol can further provide notification mechanisms that allow accessory 112 (or other accessories) to selectively notify controller 102 in the event of a state change. For example, an accessory that communicates using Bluetooth LE might broadcast an advertisement that includes information usable by a controller to determine that a change has occurred but not specifically identifying the change. Multiple notification mechanisms can be implemented, and controller 102 can register, or subscribe, for the most appropriate notification mechanism for a given purpose. Examples of notification mechanisms are described in above-referenced U.S. application Ser. No. 14/614,914.

In some embodiments, communication with a given accessory can be limited to authorized controllers. The uniform accessory protocol can specify one or more mechanisms (including mechanisms referred to herein as "pair setup" and "pair add") for establishing a "pairing" between controller 102 and a given accessory (e.g., door lock accessory 104) under circumstances that provide a high degree of confidence that the user intends for controller 102 to be able to control accessory 104. Pair setup can include an out-of-band information exchange (e.g., the user can enter a numerical or alphanumeric PIN or passcode provided by accessory 104 into an interface provided by controller 102) to establish a shared secret. This shared secret can be used to support secure exchange of "long-term" public keys between controller 102 and accessory 104, and each device can store the long-term public key received from the other, so that an established pairing can be persistent. After a pairing is established, controller 102 is considered authorized, and thereafter, controller 102 and accessory 104 can go in and out of communication as desired without losing the established pairing. (Such an accessory is referred to as being "paired" with the controller and vice versa.) When controller 102 attempts to communicate with or control accessory 104, a "pair verify" process can first be performed to verify that an established pairing exists (as would be the case, e.g., where controller 102 previously completed pair setup with accessory 104). The pair verify process can include each device demonstrating that it is in possession of a long-term private key corresponding to the long-term public key that was exchanged during pair setup. The pair-verify process can further include establishing a new shared secret or session key(s) to encrypt all communications during a "pair-verified" session (also referred to herein as a verified session). During a pair-verified session, a controller that has appropriate privileges can perform a "pair add" process to establish another pairing with the accessory on behalf of another controller. Either device can end a pair-verified session at any time simply by destroying or invalidating its copy of the session key.

In some embodiments, multiple controllers can establish a pairing with the same accessory (e.g., by performing pair setup with the accessory or by having a pairing added by a controller that previously performed pair setup with the accessory), and the accessory can accept and respond to communications from any of its paired controllers while rejecting or ignoring communications from unpaired controllers. Examples of pair setup, pair add and pair verify processes, as well as other examples of security-related operations, are described in above-referenced U.S. application Ser. No. 14/614,914.

It will be appreciated that home environment 100 is illustrative and that variations and modifications are possible. Embodiments of the present invention can be implemented in any environment where a user wishes to control one or more accessory devices using a controller device, including but not limited to homes, cars or other vehicles, office buildings, campuses having multiple buildings (e.g., a university or corporate campus), etc. Any type of accessory device can be controlled, including but not limited to door locks, door openers, lighting fixtures or lighting systems, switches, power outlets, cameras, environmental control systems (e.g., thermostats and HVAC systems), kitchen appliances (e.g., refrigerator, microwave, stove, dishwasher), other household appliances (e.g., clothes washer, clothes dryer, vacuum cleaner), entertainment systems (e.g., TV, stereo system), windows, window shades, sensor systems (e.g., smoke detector, motion detector, intrusion detector), alarm systems, and so on. A single controller can establish pairings with any number of accessories and can selectively communicate with different accessories at different times. Similarly, a single accessory can be controlled by multiple controllers with which it has established pairings. Any function of an accessory can be made controllable by modeling the function as a service having one or more characteristics and allowing a controller to interact with (e.g., read, modify, receive updates) the service and/or its characteristics. Accordingly, similar protocols and communication processes can be uniformly applied in any context with one or more controllers and one or more accessories, regardless of accessory function or controller form factor or specific interfaces.

Figure 2:
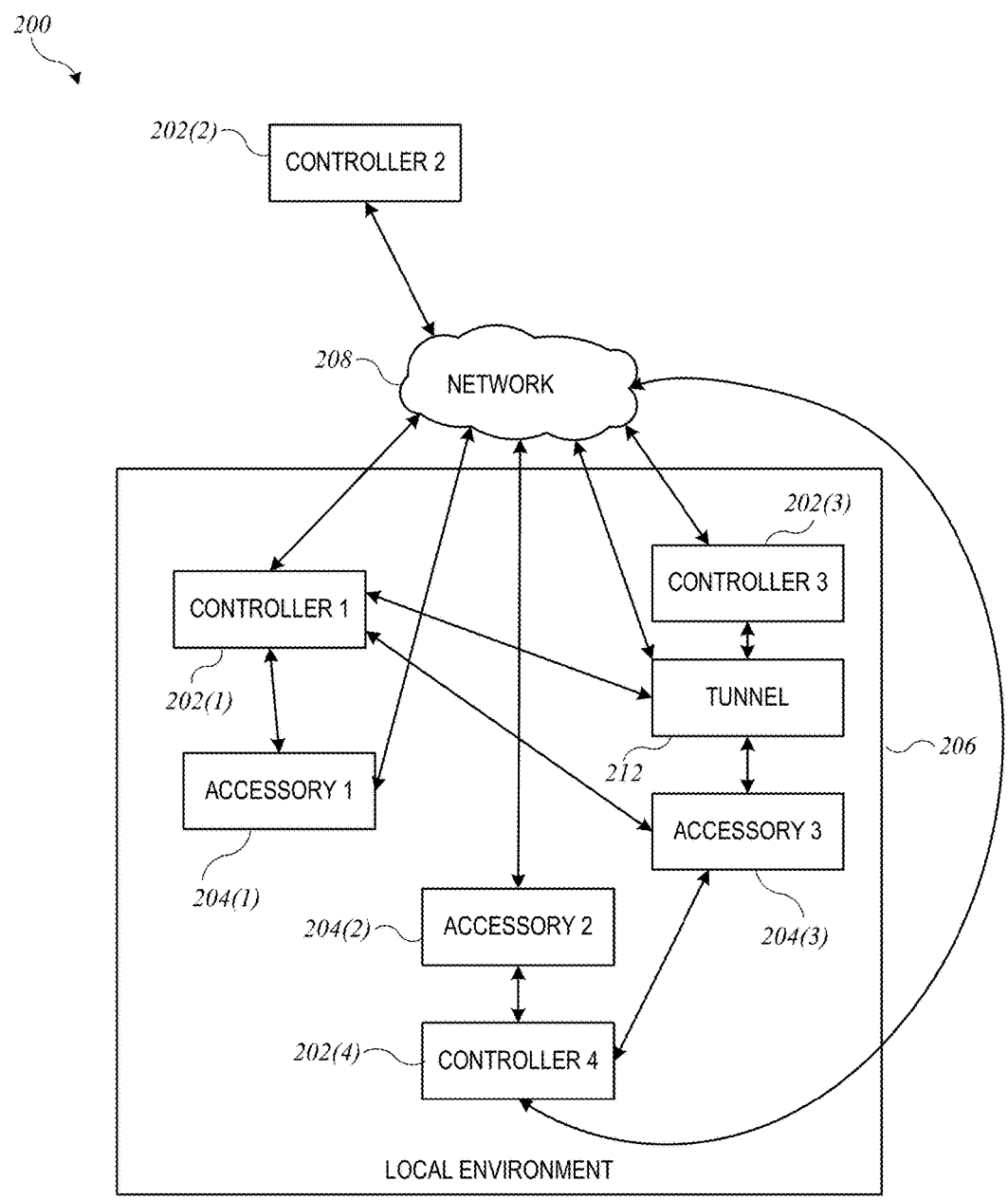
FIG. 2 shows a network configuration according to an embodiment of the present invention.

FIG. 2 shows a network configuration 200 according to an embodiment of the present invention. Configuration 200 allows controllers 202 to communicate with accessories 204 located in local environment 206 (e.g., a home environment such as home environment 100 described above). Each controller 202 can be an electronic device owned and/or operated by a user who frequents environment 206 (e.g., a resident of the home or a regular visitor to the home). Controllers 202 can each be similar to controller 102 of FIG. 1, and accessories 204 can be similar to various accessories shown in FIG. 1.

In some instances, a controller 202 can communicate directly with an accessory 204; for instance, controller 202(1) is shown communicating directly with accessories 204(1) and 204(3), and controller 202(4) is shown communicating directly with accessory 204(2). Such communication can occur using the uniform accessory protocol on any transport (or channel) supported by both controller 202(4) and accessory 204(2), such as a Bluetooth LE transport or Wi-Fi transport or the like. For purposes of the present description, it is assumed that a Bluetooth LE transport is used for direct communication between a controller and an accessory; those skilled in the art will understand that other transports can be used.

In some instances, a controller 202 can communicate indirectly with an accessory 204. For instance, accessory 204(3) is connected to tunnel 212, and controllers 202(1) and 202(3) can communicate with accessory 204(3) via tunnel 212. Communication between each of controllers 202(1) and 202(3) and tunnel 212 can occur using the uniform accessory protocol on any transport supported by the controller and the tunnel, and communication between tunnel 212 and accessory 204(3) can occur using the uniform accessory protocol on any transport supported by the accessory and the tunnel. For purposes of the present description, it is assumed that tunnel 212 and controllers 202(1), 202(3) can all connect to a wireless local area network (LAN) in local environment 206 (e.g., a Wi-Fi network) and that tunnel 212 communicates with accessory 204(3) using Bluetooth LE as a transport. Other configurations can be substituted. Tunnel 212 can operate to relay commands between a controller (e.g., controller 202(1) or 202(3)) and an accessory (e.g., accessory 204(3)); in some embodiments, tunnel 212 can also translate between different communication protocols used by controllers 202 and accessory 204(3). In some embodiments, tunnel 212 can provide or support secure end-to-end communication between controller 202(1) or 202(3) and accessory 204(3). Examples of tunnels and other proxies that can provide indirect communication paths to accessories are described in above-referenced U.S. application Ser. No. 14/725,891.

In the example of FIG. 2, controllers 202(1), 202(3), and 202(4) are currently located in local environment 206 with accessories 204. Controller 202(2) is currently located outside local environment 206 but is connected to a communication network 208 (e.g., the Internet); such a controller is said to be "remote" from accessories 204. It is to be understood that any or all of controllers 202 can be mobile devices that are sometimes within local environment 206 and sometimes outside local environment 206. Accessories 204 need not be mobile and need not be connected to communication network 208. In some embodiments, a coordinator (e.g., coordinator 116 of FIG. 1) can be connected to communication network 208 and can facilitate access to accessories 204 by remote controller 202(2). In some embodiments, remote communication via network 208 can use a secure relay service to protect the integrity and secrecy of messages; examples of a secure relay service are described in above-referenced Provisional Application No. 62/171,995. In some embodiments, an accessory 204 becomes available to communicate with a particular controller 202 via network 208 only after the devices become associated with each other at the secure relay service. Each controller 202 can store information indicating which accessories 204 are available to it via network 208.

In the configuration shown, various accessories 204 are reachable by different controllers 202 using different paths. For example, controller 202(1) has a direct path to accessories 204(1) and 204(3), a tunnel path (via tunnel 212) to accessory 204(3), and a "remote" path (via network 208) to accessories 204(1), 204(2), and 204(3) (in the last case, the remote path also includes tunnel 212). Controller 202(2) has a remote path to all accessories 204. Controller 202(3) has a tunnel path to accessory 204(3) and a remote path to accessories 204(1) and 204(2). Controller 202(4) has a direct path to accessories 204(2) and 204(3) and no path to accessory 204(1).

It will be appreciated that network configuration 200 is illustrative and that variations and modifications are possible. Any number of controllers and any number of accessories can be included in a network configuration. In some embodiments, a single controller 202 can have multiple possible paths to a given accessory 204 (including direct and/or indirect paths), and an accessory may expose different paths to different controllers. Some or all of accessories 204 may be accessible only within the local environment. Further, different controllers 202 may have different levels of permission in regard to accessing accessories 204; for instance, remote access via network 208 may be permitted for some controllers 202 but not for other controllers 202. Those skilled in the art with access to the present disclosure will appreciate that techniques described herein can be used for secure communication between controllers and accessories using direct and/or indirect communication paths as desired, including paths where a tunnel may act as an intermediary.

In some embodiments, a coordinator device (or "coordinator," e.g., coordinator 116 of FIG. 1) can be provided with local environment 206. As used herein, a "coordinator" can be an electronic device that is capable of operating as a controller of accessories 204 as well as relaying messages from other controllers (e.g., controllers 202) to accessories 204. In some embodiments, a coordinator can be an "intelligent" device that can coordinate operations among multiple controllers and/or accessories and is not limited to passively relaying messages. The coordinator may also be configured to serve as an interface point between network 208 and some or all of accessories 204, thereby facilitating remote-path communications. Examples of coordinators are described in above-referenced U.S. application Ser. No. 14/725,891.

Example Controller Device

As used herein, the term "controller device" (or "controller") refers generally to any device capable of controlling one or more accessories in an automated environment, e.g., as described above. In some embodiments, a controller device can be implemented in a multifunctional device such as a smart phone, tablet computer, or the like, e.g., by deploying appropriate application software on the device.

Figure 3:
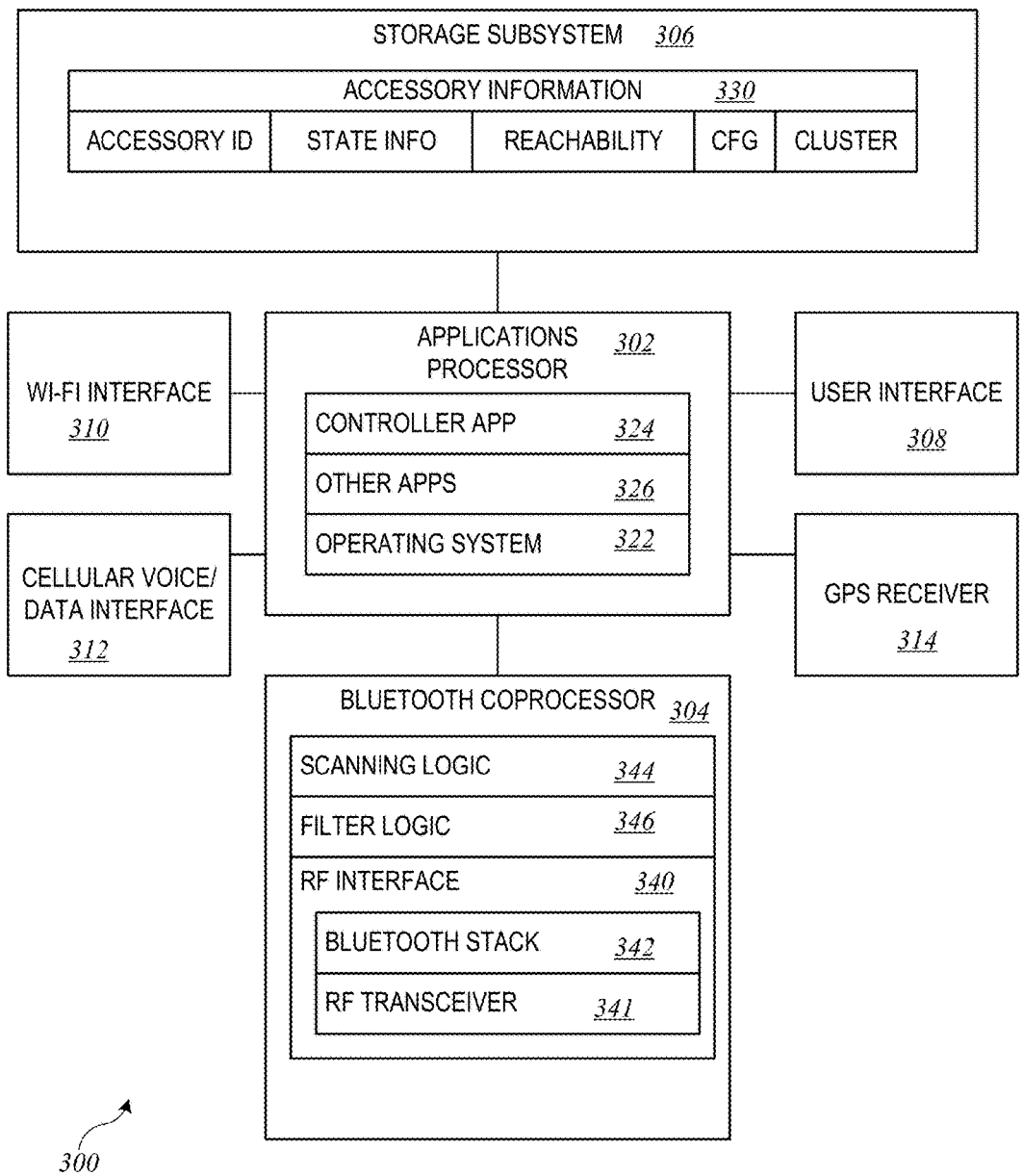
FIG. 3 shows a simplified block diagram of a controller implemented in a multifunctional device according to an embodiment of the present invention.

FIG. 3 shows a simplified block diagram of a controller 300 that can be implemented in a multifunctional device according to an embodiment of the present invention. Controller 300 can correspond, e.g., to controller 102 of FIG. 1 or any of controllers 202 of FIG. 2. Controller 300 can implement any or all of the controller functions, behaviors, and capabilities described herein, as well as other functions, behaviors, and capabilities not expressly described. Controller 300 can include applications processor 302, Bluetooth coprocessor 304, storage device 306, user interface 308, Wi-Fi interface 310, cellular voice/data interface 312, and GPS receiver 314. Controller 300 can also include other components (not explicitly shown) such as a battery, power controllers, and other components operable to provide various enhanced capabilities. In various embodiments, controller 300 can be implemented in a desktop computer, laptop computer, tablet computer, smart phone, other mobile phone, wearable computing device, or other systems having any desired form factor.

Storage subsystem 306 can be implemented, e.g., using disk, flash memory, or any other non-transitory storage medium, or a combination of media, and can include volatile and/or non-volatile media. In some embodiments, storage subsystem 306 can store one or more application and/or operating system programs to be executed by applications processor 302 and/or Bluetooth coprocessor 304, including programs to implement various operations described above as being performed by a controller. Specific examples are described below.

User interface 308 can include input devices such as a touch pad, touch screen, scroll wheel, click wheel, dial, button, switch, keypad, microphone, or the like, as well as output devices such as a display screen, indicator lights, speakers, headphone jacks, or the like, together with supporting electronics (e.g., digital-to-analog or analog-to-digital converters, signal processors, or the like). A user can operate input devices of user interface 308 to invoke the functionality of controller 300 and can view and/or hear output from controller 300 via output devices of user interface 308.

Applications processor 302 can be implemented as one or more integrated circuits, e.g., one or more single-core or multi-core microprocessors or microcontrollers, examples of which are known in the art. In operation, applications processor 302 can operate as a primary processor to control the operation of controller 300. For example, applications processor 302 can execute operating system program(s) 322. In various embodiments, applications processor 302 can execute a variety of programs, including controller application ("app") 324 and other apps 326, and can maintain multiple concurrently executing programs or processes. At any given time, some or all of the program code to be executed can be resident in internal working memory of applications processor 302 and/or in storage media such as storage subsystem 306.

Through suitable programming, applications processor 302 can provide various functionality for controller 300. For example, in some embodiments, applications processor 302 can implement various processes (or portions thereof) described herein as being implemented by a controller. Applications processor 302 can also execute other programs to control other functions of controller 300, including application programs that may be stored in storage subsystem 306. In some embodiments, these application programs may interact with an accessory, e.g., by generating messages to be sent to the accessory and/or receiving responses from the accessory. Such interactions can be facilitated by various supporting processes that may be incorporated into operating system program(s) 322.

Controller app 324 can support operation of controller 300 to control accessory devices. For example, in some embodiments controller app 324 can include program code executable to read an accessory description record and generate a graphical user interface (e.g., via user interface 308) for controlling the accessory based on information therein (e.g., as described in above-referenced U.S. application Ser. No. 14/614,914). In some embodiments, portions (or all) of the controller functionality described herein can be implemented in operating system programs rather than applications.

Controller app 324 can also maintain information about the controllable accessories. For example, controller app 324 can maintain accessory information table 330 in storage subsystem 306. Accessory information table 330 can be used to store information about accessories controllable by controller app 324. For instance, accessory information table 330 can include an entry for each paired accessory (e.g., an accessory that has an established pairing with controller 300 using pair setup or pair add processes as described above). The information stored in the entry for a paired accessory can include state information for the accessory (e.g., all or part of the attribute database as read from the accessory), reachability information indicating which of the possible communication paths are currently available for communicating with the accessory (e.g., direct, tunnel, and/or remote paths), configuration data ("CFG") including a configuration number, checksum, and/or other data usable to detect state changes based on accessory broadcasts, and cluster information identifying one or more devices that have been clustered with the accessory by controller app 324. Examples of processes for maintaining reachability, configuration data, and cluster information are described below.

Bluetooth coprocessor 304 is an example of a communications coprocessor. Bluetooth coprocessor 304 can be implemented as one or more integrated circuits, e.g., one or more single-core or multi-core microprocessors or microcontrollers, examples of which are known in the art. Bluetooth coprocessor 304 can include an RF interface 340, which can include standard radio frequency (RF) transceiver components 341 and associated control logic, e.g., Bluetooth stack 342, to send and receive signals conforming to Bluetooth protocols (e.g., Bluetooth LE and/or Bluetooth Classic).

In addition, Bluetooth coprocessor 304 can include scanning logic 344 and filter logic 346, each of which can be implemented, e.g., using program code (firmware or the like) executable by suitably configured processing circuitry within Bluetooth coprocessor 304. In some embodiments, scanning logic 344 can dynamically determine scanning parameters and perform scanning operations to detect accessory advertisements. Filter logic 346 can execute various filtering instructions based on the results of a scanning operation in order to determine whether to make connections, send event notifications to applications processor 302 (or specific processes or apps executing thereon), and so on. Filtering instructions can be provided by various applications executing on apps processor 302, including controller app 324. Examples of filtering are described below.

In some embodiments, providing scanning logic 344 and filter logic 346 within Bluetooth coprocessor 304 allows controller 300 to scan for Bluetooth advertisements and process scan results to identify advertisements of interest while other portions of controller 300, such as applications processor 302, are in a low-power (sleep) state. Filtering instructions can be provided that configure filter logic 346 can be configured to selectively wake applications processor 302 in response to detecting events of interest. This can help to reduce power consumption by controller 300.

Wi-Fi interface 310 and cellular voice/data interface 312 can provide additional communication capability for controller 1100. In some embodiments, Wi-Fi interface 310 and cellular voice/data interface 312 can include RF transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), and/or other components. In some embodiments a wired communication interface (e.g., an Ethernet or USB interface or the like) can be provided. Wi-Fi interface 310 and cellular voice/data interface 312 can be implemented using a combination of hardware (e.g., driver circuits, antennas, modulators/demodulators, encoders/decoders, and other analog and/or digital signal processing circuits) and software components. In some embodiments, the various communication interfaces of controller 300 can support multiple communication channels concurrently or at different times, using the same transport or different transports. In some embodiments, some or all of the RF circuitry and related processing circuitry can be shared across multiple transports.

Global Positioning System (GPS) receiver 314 can include RF transceiver components for receiving positioning signals from GPS satellites or the like, as well as control logic operable to determine a geolocation based on the received signals. Conventional techniques for receiving and processing GPS satellite signals can be used.

In various embodiments, other components can also be included in addition to or instead of those shown. For instance, controller 300 can incorporate a cryptographic logic module and a secure storage module to facilitate cryptographic operations (e.g., encrypting messages to accessories and/or decrypting messages from accessories) secure storage of sensitive information such as the controller's long-term public and secret keys and a lookup table that maps an accessory identifier to an accessory long-term public key for each paired accessory. Other components can be provided to support other functions, not necessarily related to controlling accessory devices (e.g., Near-Field Communication transceivers, cameras, motion sensors such as accelerometers and gyroscopes, compass, magnetometer, light sensors, and so on).

It will be appreciated that the system configurations and components described herein are illustrative and that variations and modifications are possible. It is to be understood that an implementation of controller 300 can perform all operations described herein as being performed by a controller. In addition, while some operations and activities are described as being performed by applications processor 302 while other operations and activities are described as being performed by Bluetooth coprocessor 304, this is not required. For instance, in some embodiments, any or all of the scanning parameter determination and/or filtering operations described herein (e.g., with reference to scanning logic 344 and filter logic 346) can be performed by applications processor 302. Offloading tasks to Bluetooth coprocessor 304 can reduce power consumption, e.g., by allowing applications processor 302 to spend more time in a low-power (sleep) state, but dynamically adapting the scanning behavior to device context (e.g., as described below) can also reduce power consumption even where filtering is performed by the applications processor.

Further, while the controller is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate circuitry, and various blocks might or might not be reconfigurable depending on how the initial configuration is obtained. Embodiments of the present invention can be realized in a variety of apparatus including electronic devices implemented using any combination of circuitry and software. Controllers as described herein are capable of interoperating with a wide range of accessories, including any accessory capable of advertising and communicating via a wireless communication channel (e.g., Bluetooth LE). It should be noted that the accessory need not have any particular control logic; for instance, an accessory can be programmed to broadcast advertisements according to any desired schedule, and a controller can adapt to an accessory's schedule as described below.

Example Dynamic Scanning

In some embodiments, a controller can track the reachability of accessories with which it has an established pairing. As described above, there may be multiple possible paths for communicating with a given accessory, and reachability can be tracked for each possible path Where the path uses a continuously maintained connection (e.g., a typical Wi-Fi network), a controller connected to the Wi-Fi network can track reachability by detecting when an accessory joins or leaves the Wi-Fi network. For a remote path (e.g., via network 208 of FIG. 2), a controller can use information from the accessory attribute database to determine whether the accessory is configured for remote access. In some embodiments, the controller may have established a "remote" pairing with the accessory on a secure relay service. As described in above-referenced Provisional Application No. 62/171,995, this can be different from the local pairing established using pair setup or pair add as described above. In such cases, the controller can assume that the accessory is reachable via the remote path as long as the controller itself can communicate with network 208.

For a direct path where the connection is not continuously maintained, such as a Bluetooth LE path, it is assumed herein that an accessory that is not currently connected to a controller periodically broadcasts an advertisement. The advertisement can be broadcast in accordance with standard Bluetooth LE specifications and may include information usable by the controller to recognize the accessory as one that has been paired with the controller. In some embodiments, the advertisement can also include information indicating the advertising interval and length that the accessory is using. (As described below, the controller can use information about an accessory's advertising interval and duration to assess the likelihood of detecting the accessory using a given scanning behavior and/or to determine a scanning behavior that can increase the likelihood of quickly detecting the accessory.

A controller can from time to time perform a scanning operation (e.g., a conventional Bluetooth LE scanning operation or other operation) to determine whether the accessory is visible. (In this context, the accessory is considered "visible" if the controller detects an advertisement from the accessory during a scan.) Those skilled in the art will appreciate that increasing the frequency with which the scanning operation is repeated and/or increasing the period of time that the controller spends listening (the combination of which determines a scanning duty cycle) should increase the likelihood of detecting any accessory that happens to be advertising. However, increasing the scanning duty cycle also increases power consumption by the controller, which may not be desirable.

Figure 4:
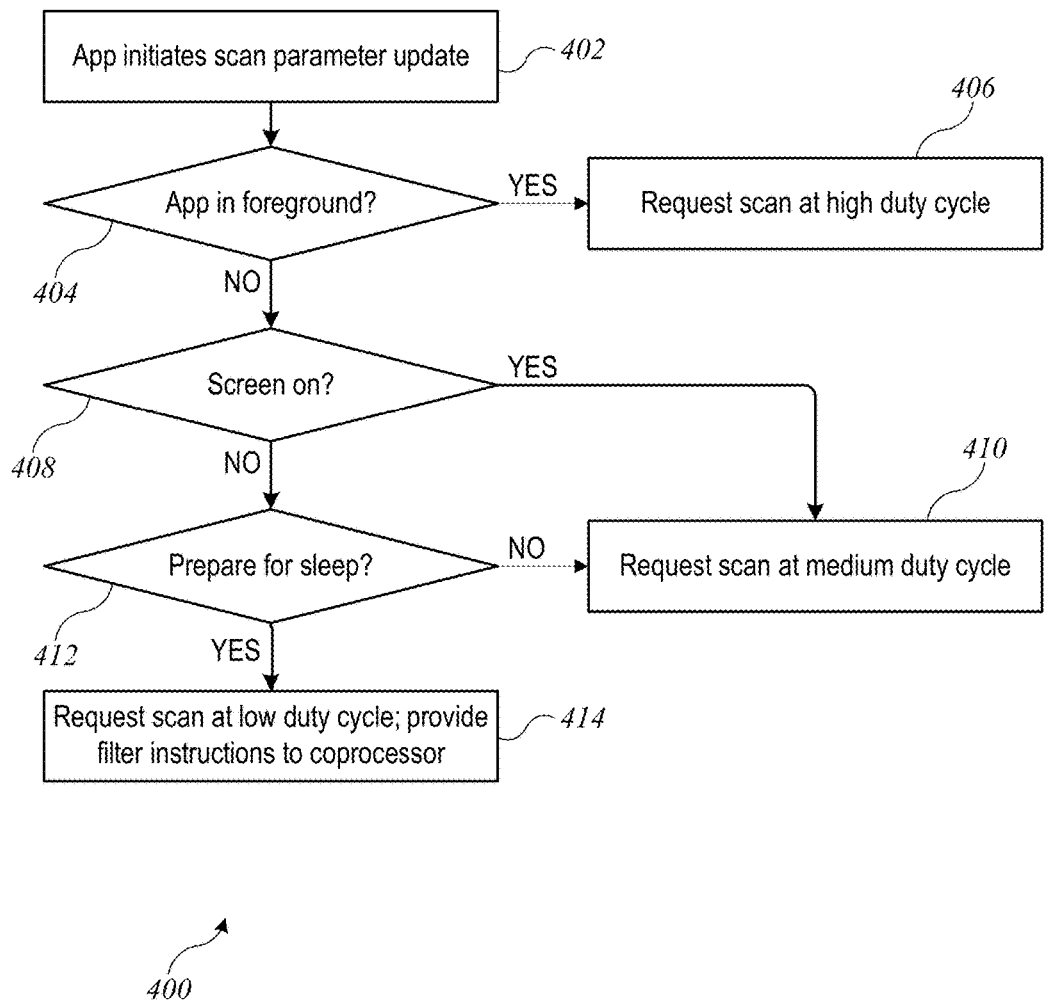
FIG. 4 shows a flow diagram of a process for dynamically adjusting scanning behavior according to an embodiment of the present invention.

Accordingly, a scanning strategy can be implemented that allows the controller to dynamically adjust its scanning duty cycle based on its current operating context. FIG. 4 shows a flow diagram of a process 400 for dynamically adjusting scanning behavior according to an embodiment of the present invention. Process 400 can be implemented, e.g., in controller 300 of FIG. 3. In some embodiments, process 400 can be included in controller app 324.

Process 400 can begin at block 402, when controller app 324 can initiate a scan parameter update. This may occur in response to a detected change in the status of controller app 324 or other components of controller 300. At block 404, controller app 324 can determine whether it is being executed in the foreground (as used herein, "foreground" can indicate that the app is in a state to receive user input, such as an app that is generating a graphical user interface image currently being displayed). It is assumed that if app 324 has been brought to the foreground, it is likely that the user wants to interact with one or more controllable accessories. Accordingly, at block 406, controller app 324 may request scanning at a high duty cycle. All requests for scanning can be made, e.g., by sending a communication to scanning logic 344 of Bluetooth coprocessor 304, with information indicating preferred scanning parameters (e.g., a preferred duty cycle or a specific scanning interval and/or scan duration).

At block 408, if controller app 324 is not in the foreground, process 400 can determine whether the user appears to be actively engaged with controller 300 (e.g., whether the device's screen is on). If so, then it is possible that the user will soon request an interaction with one or more controllable accessories. Accordingly, at block 410, controller app 324 may request scanning at a medium duty cycle.

If the user does not appear to be actively engaged with controller 300, it may be appropriate for applications processor 302 to enter a sleep state to conserve power. In some embodiments, operating system program(s) 322 can determine when applications processor 302 should enter the sleep state and notify controller app 324 to prepare for sleep. If, at block 412, controller app 324 does not receive a sleep notification, then at block 410, controller app 324 may request scanning at a medium duty cycle.

If, at block 412, controller app 324 receives a sleep notification, then at block 414, controller app 324 can request scanning at a low duty cycle. In addition, controller app 324 can provide filtering instructions to Bluetooth coprocessor 304, e.g., by sending a communication to filter logic 346. The filtering instructions can specify conditions under which applications processor 302 should be awakened from sleep state so that controller app 324 should be notified of a scan result. Specific examples are described below.

Process 400 is illustrative, and variations and modifications are possible. Process 400 can be executed whenever some condition occurs that may lead to reevaluating the preferred scan parameters for controller app 324. The specific definitions for duty cycles defined as "high," "medium," and "low" can be varied. In one embodiment, a "high" duty cycle may refer to a scanning interval of 60 ms and a scan duration of 30 ms (50% duty cycle); a "medium" duty cycle may refer to a scanning interval of 300 ms and a scan duration of 30 ms (10% duty cycle); and a "low" duty cycle may refer to a scanning interval of 966 ms and a scan duration of 30 ms (3% duty cycle). Other definitions can be substituted, provided that the relative magnitudes of the duty cycles is preserved. In some embodiments, different duty cycles may be requested depending on whether the screen is on or off while applications processor 302 is awake and controller app 324 is not in foreground. For instance, the duty cycle may be 25% if the screen is on and 10% if the screen is off.

In some embodiments, controller app 324 may specify a preferred duty cycle by specifying one of a number of preconfigured options (e.g., high, medium, or low) supported by Bluetooth coprocessor 304, and the specific scanning interval and scan duration can be determined by Bluetooth coprocessor 304. In other embodiments, controller app 324 may specify preferred scanning interval and/or scan duration.

It should be understood that Bluetooth coprocessor 304 might not actually scan according to the preferred duty cycle requested by controller app 324. For instance, as noted above, controller 300 can be a multifunctional device, and other apps and processes executing therein may communicate with Bluetooth devices. These other apps and processes can also send requests for their preferred scanning duty cycles (or other scanning parameters) to Bluetooth coprocessor 304. Scanning logic 344 in Bluetooth coprocessor 304 can aggregate the requests and select an "actual" duty cycle and/or scanning parameters accordingly. For instance, scanning logic 344 may select scanning parameters that provide a duty cycle equal to the highest duty cycle among all the requests. Thus, in some embodiments, the actual scanning duty cycle may be higher than the preferred duty cycle requested by controller app 324 but will not be lower.

In some embodiments, filtering instructions are provided and updated when applications processor 302 is preparing for sleep; in other embodiments, any request for scanning can include filtering instructions indicating which detected events should be reported to the requesting app, regardless of whether applications processor 302 is awake or asleep when the event is detected.

In the case of controller app 324, the filtering instructions can include identifiers (e.g., MAC address or name field of the advertisement) of accessories of interest, which can include any accessories with which controller 300 has an established pairing. In some embodiments, Bluetooth coprocessor 304 can read accessory information 330 from storage subsystem 306, or the accessory advertisement can contain sufficient information for Bluetooth coprocessor 304 to determine whether an accessory is of interest to controller app 324, and providing a list of such accessories to filter logic 346 is not required. The filtering instructions can also indicate conditions or events that, if detected in regard to an accessory of interest, should result in notifying controller app 324. In some embodiments, these conditions or events can include any or all of the following:

(1) An accessory of interest that is currently identified as not reachable via a direct path becomes visible in a scan.

(2) Content of an accessory advertisement indicates that the accessory is advertising a state change or configuration update.

(3) An accessory currently identified as reachable via a direct path ceases to be detectable.

Figure 5:
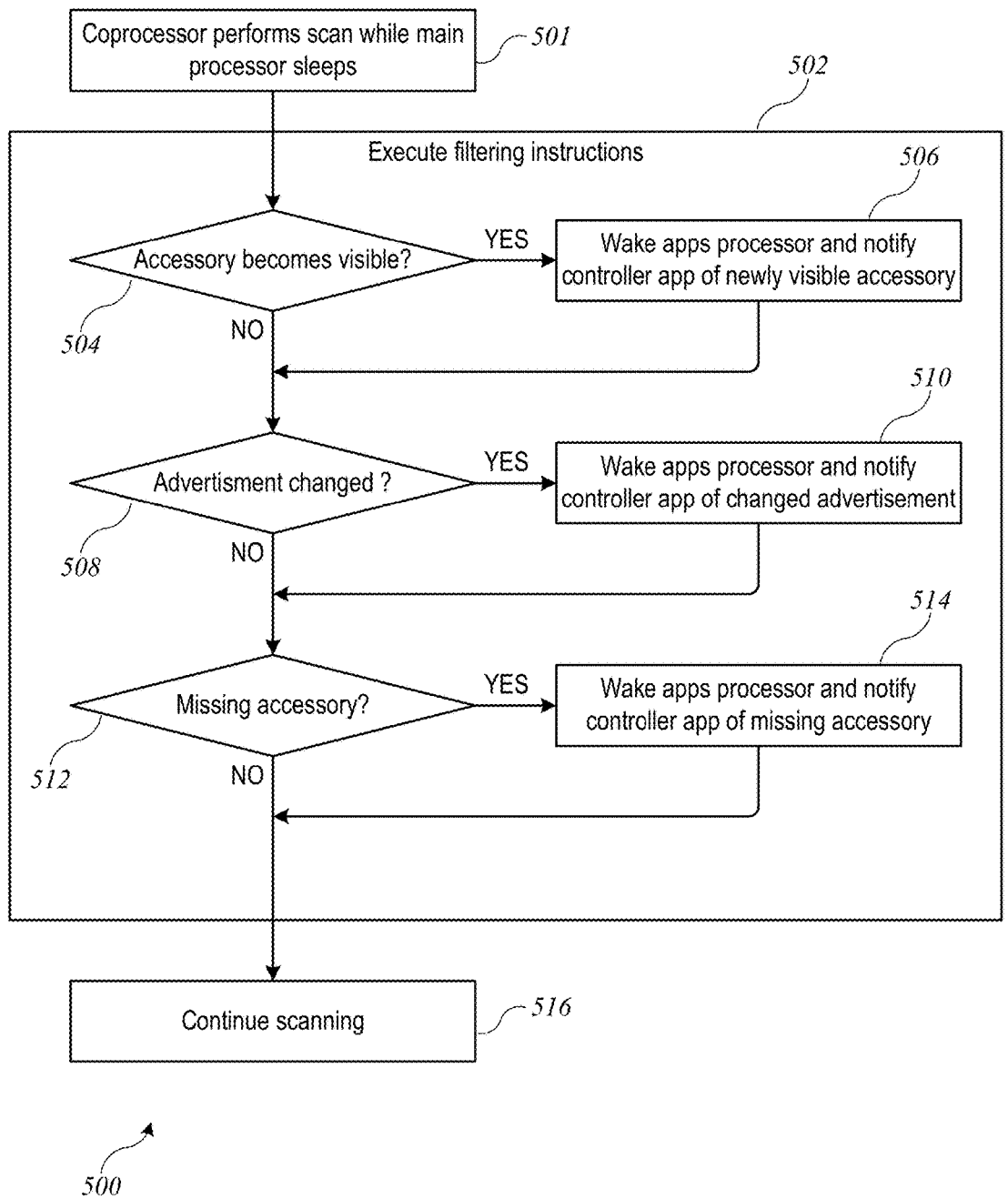
FIG. 5 shows a flow diagram of a filtering process that can be used to process scan results according to an embodiment of the present invention.

These conditions (or others) can be tested by filter logic 346 of Bluetooth coprocessor 304, which can generate appropriate notifications to controller app 324. FIG. 5 shows a flow diagram of a filtering process 500 that can be used to process scan results according to an embodiment of the present invention. Process 500 can be implemented, e.g., in filter logic 346 of Bluetooth coprocessor 304 in response to filtering instructions provided by controller app 324. In the example described, filtering process 500 is performed while applications processor 302 is asleep; however, a similar process can also be used if applications processor 302 is awake during scanning.

At block 501, Bluetooth coprocessor 304 can perform a scan to listen for advertisements, e.g., based on scanning parameters determined by scanning logic 344. Conventional Bluetooth LE scanning techniques or other techniques can be used.

At block 502, Bluetooth coprocessor 304 can execute any filter instructions received from controller app 324 and/or other apps that may be executing on applications processor 302. For instance, at block 504, filter logic 346 can determine whether an accessory of interest has become visible. For example, in addition to the accessory identifiers for accessories of interest, the filtering instructions from controller app 324 can include a reachability flag indicating whether controller app 324 has determined (e.g., based on previous scans) that the accessory is reachable via Bluetooth LE. In some embodiments, Bluetooth coprocessor 304 can read the reachability information and/or other accessory information from storage subsystem 306. At block 504, filter logic 346 can determine whether the scan at block 502 detected an advertisement from an accessory that is currently flagged as unreachable. If so, then at block 506, process 500 can wake applications processor 302 and notify controller app 324 that the accessory is now visible. Controller app 324 can take various actions in response to this notification; examples are described below.

At block 508, filter logic 346 can determine whether an advertisement received from an accessory of interest has changed since the last advertisement that was detected. For example, in some embodiments, controller app 324 (or filter logic 346) can compute a checksum for each received advertisement (e.g., using conventional checksum algorithms). Controller app 324 or filter logic 346 can store the most recent checksum, e.g., as configuration data in accessory information 330. When filter logic 346 detects an advertisement from a reachable accessory, filter logic 346 can compute a checksum for the advertisement and compare it to the stored checksum. If a change is detected, then at block 510, process 500 can wake applications processor 302 and notify controller app 324 that the accessory's advertisement has changed. Controller app 324 can take various actions in response to this notification; examples are described below.

In some embodiments, to increase the likelihood of controller 300 quickly detecting a change in an advertisement, the accessory can be configured to temporarily increase the frequency of its advertisements after making the change. For instance, for a period of 5 seconds after making the change, the accessory can advertise at 20 ms intervals, then revert to its normal advertising schedule. Other schedules can also be used.

At block 512, filter logic 346 can determine whether an accessory of interest that is currently flagged as reachable becomes "missing." In some embodiments, an accessory can be defined as missing if it is not detected in any scans for at least a minimum interval of time (e.g., 5 seconds, 10 seconds, 30 seconds, etc.). The minimum time interval can be chosen as desired. For example, in some embodiments, an accessory advertisement may include fields indicating the advertising interval and length. Based on this information and the scanning parameters, it is possible to use an advertising simulation algorithm to predict the probability of detecting at least one advertisement from the accessory within any given time period. The simulation can take into account the actual time of the last detected advertisement to predict future advertisement times and can also model real-world effects such as random fluctuations in the time interval between broadcasts and/or scans, noise models reflecting the environment within which controller 300 is operating, and so on. Based on result of the simulation algorithm, a minimum time interval can be selected such that the probability of detecting at least one advertisement, assuming the accessory does not deviate from its advertised schedule, is sufficiently high to justify an inference that the absence of detected advertisements is not due to chance (e.g., 90%, 95%, 99%). In general, the higher the probability, the longer the minimum time interval. If an accessory is determined to be missing, then at block 514, process 500 can wake applications processor 302 and notify controller app 324 that the accessory is missing. Controller app 324 can take various actions in response to this notification; examples are described below At block 516, scanning can continue, and process 500 can be repeated. In some embodiments, scanning can continue regardless of whether apps processor 302 is awake or asleep, although a transition from waking to sleeping (or vice versa) may result in changing the scanning parameters, e.g., because one or more apps may request different scanning parameters depending on whether applications processor 302 is awake or asleep. It is to be understood that other filter instructions and/or conditions can be implemented in addition to or instead of the examples shown. For instance, the accessory advertisement may include accessory "class" information indicating a category of accessory functionality (e.g., security, lighting, environmental control, etc.), and controller app 324 may provide filtering instructions based on accessory class. In one such example, controller app 324 may request to be notified of changed advertisements for only certain accessories or classes of accessories (e.g., only for the security class).

Controller app 324 can take various actions in response to notifications from filter logic 346. For example, in the case of a newly visible accessory (block 506 of process 500), controller app 324 can update the reachability data for the accessory to flag it as reachable via Bluetooth LE and can determine whether to track the accessory's reachability status and/or other information (e.g., state changes). In some embodiments, controller app 324 may read all or part of the newly visible accessory's attribute database to determine the current state of the accessory. The particular decisions and actions may depend on the particulars of the accessory (e.g., accessory class, elapsed time since controller app 324 last communicated with the accessory, etc.).

In the case of a changed advertisement (block 510 of process 500), the advertisement may indicate that some aspect of the accessory's configuration or state has changed without providing specifics as to which aspect changed or what change occurred. Accordingly, controller app 324 may read all or part of the accessory's attribute database to determine the particulars of the configuration or state change and update its accessory information store accordingly. Such reading can be selective; for instance, controller app 324 may be interested in changes to the state of security accessories (e.g., door locks) but not of lighting accessories.

Figure 6:
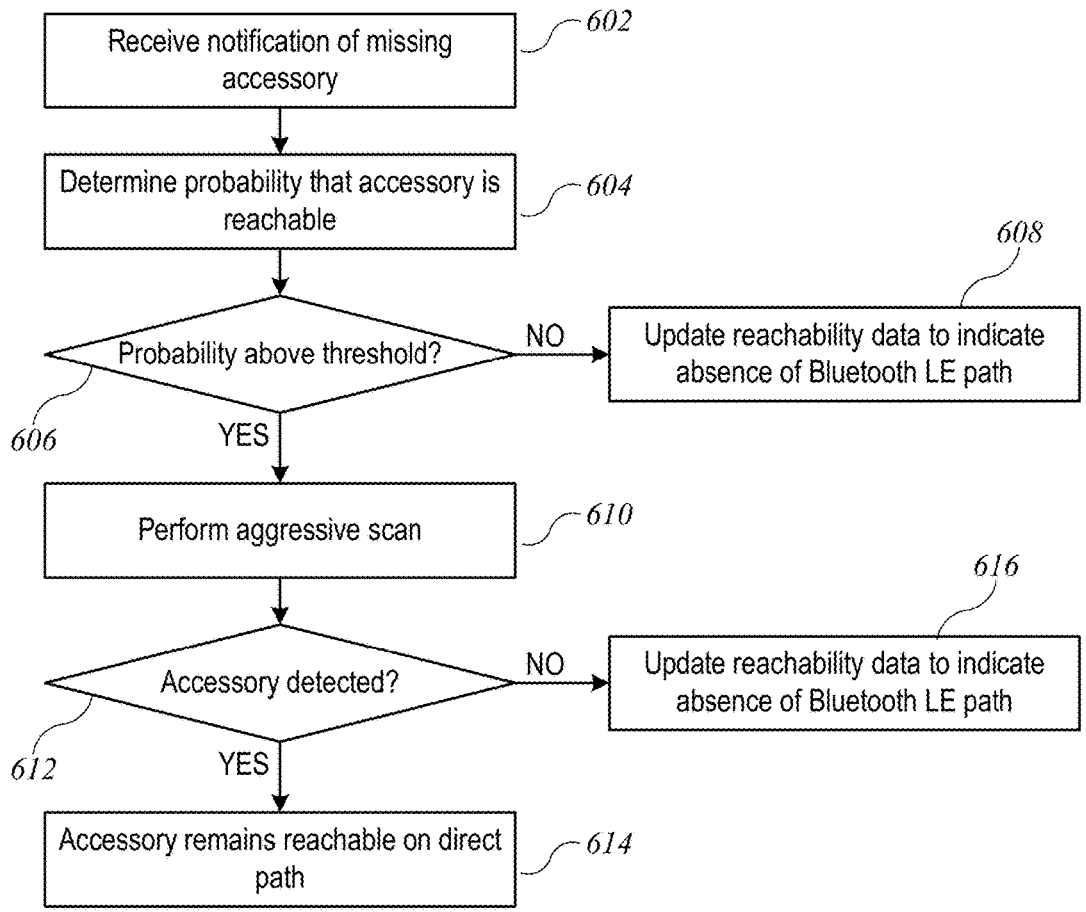
FIG. 6 shows a flow diagram of a process for determining whether to scan more aggressively for a missing accessory according to an embodiment of the present invention.

In the case of a missing accessory (block 514 of process 500), controller app 324 can determine whether to scan more aggressively (e.g., with a higher duty cycle or for a longer period of time) in an attempt to detect the accessory's advertisement. FIG. 6 shows a flow diagram of a process 600 for determining whether to scan more aggressively for a missing accessory according to an embodiment of the present invention. Process 600 can be implemented, e.g., in controller app 324.

Process 600 can begin at block 602, when controller app 324 receives a notification of a missing accessory (e.g., as a result of block 514 of process 500). The notification can include an identifier of the accessory and/or other information (e.g., when the accessory was last detected, what scanning parameters were used for the scans that failed to detect the accessory, etc.).

At block 604, process 600 can determine an estimate of probability that the accessory is reachable despite the absence of a detected advertisement. In some embodiments, this estimate can make use of an advertising simulation algorithm (e.g., as described above). In some embodiments, the estimate can include information previously received by controller app 324 from the accessory. For instance, the accessory may be powered by a battery, and controller app 324 may have previously received battery status information indicating a low battery, from which a probability that the accessory now has insufficient power to communicate can be inferred. In some embodiments, the estimate can take into account available information as to the current location of controller 300 relative to the missing accessory; an example is described below with reference to FIGS. 7 and 8.

At block 606, process 600 can determine whether the probability estimate determined at block 604 is above a threshold; if not, then at block 608, process 600 can update the reachability data for the missing accessory to indicate that a Bluetooth LE path is not available. (Other paths, including direct and/or indirect paths, may be available, and reachability data for these paths is not affected by process 600.) The threshold can be selected as desired, with a higher threshold resulting in fewer resources expended on scanning but a greater likelihood that an accessory that is in fact reachable on the Bluetooth LE path will be presumed unreachable.

If, at block 606, the probability estimate is above the threshold, then at block 610, process 600 can direct an "aggressive" scan to attempt to detect the accessory (by detecting its advertisement). An "aggressive" scan can be, e.g., a scan using the highest duty cycle supported by Bluetooth coprocessor 302 or a scan using a higher duty cycle than the scan(s) that failed to detect the missing accessory. The duration of the aggressive scan can be specified to include multiple scan periods to increase the likelihood of detection. In some embodiments, parameters for an aggressive scan can be determined based on the advertising simulation algorithm, with the goal being to achieve a probability of at least P to detect the accessory within a time interval T (assuming the accessory is broadcasting). The parameters P and T can be chosen as desired. For instance, P can be 90%, 95%, 99%; T can be 2 seconds, 5 seconds, 10 seconds, or the like. In general, increasing P and/or T increases the likelihood of detecting any accessory that is advertising but also increases the resource costs (e.g., power and time). In some embodiments, P and/or T can depend on the probability determined at block 604: the more probable it is that the accessory is reachable, the more resources are deemed worth expending in the search.

At block 612, process 600 can determine whether the aggressive scan resulted in detecting the missing accessory. If so, then at block 614, the accessory can remain flagged as reachable on the Bluetooth LE path. If not, then at block 616, the reachability data can be updated to indicate that the accessory is not reachable on the Bluetooth LE path. (This may remain the case until the accessory is detected as a newly visible accessory, e.g., at block 504 of process 500 described above.)

Figure 7:
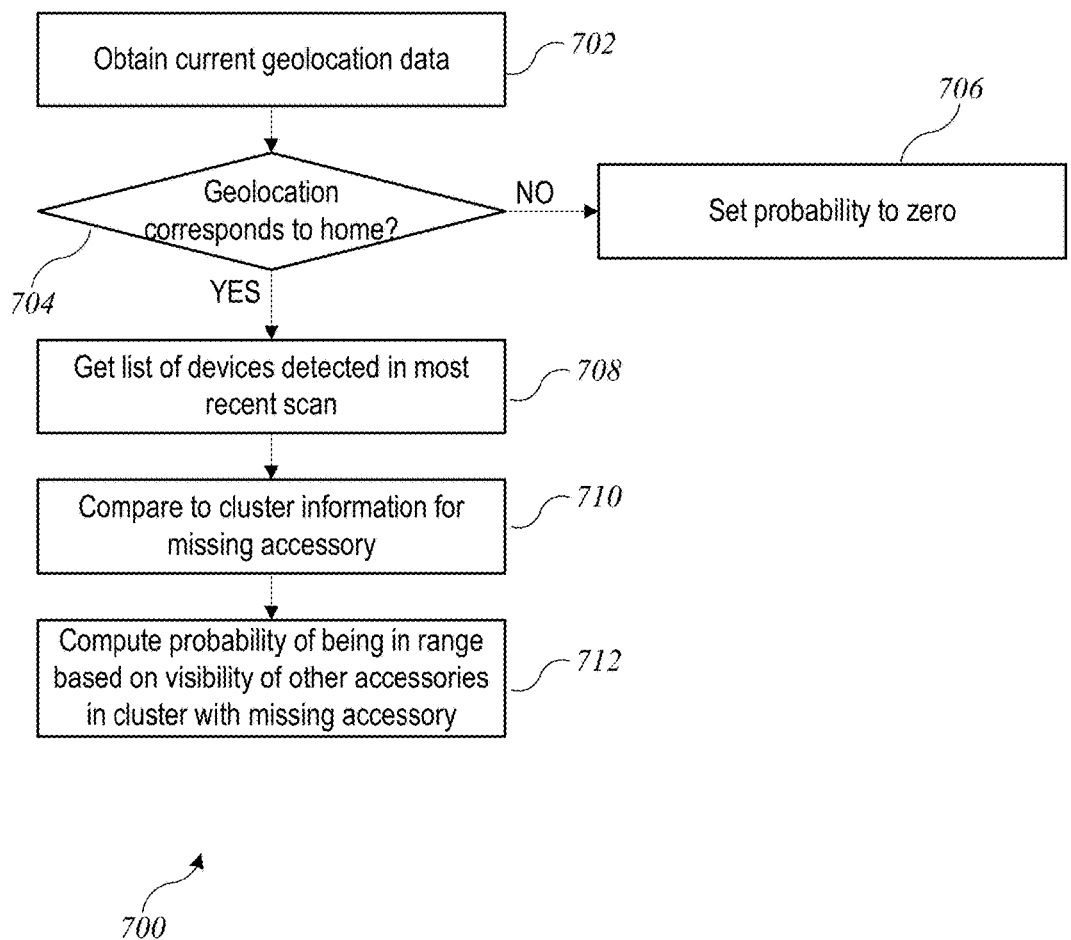
FIG. 7 is a flow diagram of a process that can be used to compute an estimate of the probability that an accessory is in communication range according to an embodiment of the present invention.

FIG. 7 is a flow diagram of a process 700 that can be used to compute an estimate of the probability that an accessory is in communication range according to an embodiment of the present invention. Process 700 can be performed, e.g., at block 604 of process 600. Process 700 assumes that that the accessory in question is fixedly installed in the home environment, unlike controller 300, and that when controller 300 is outside the home environment, it should not expect to see the accessory.

At block 702, controller app 324 can obtain current geolocation data for controller 300, e.g., using GPS receiver 314. Other sources of geolocation data can also be used, e.g., Wi-Fi fingerprinting or the like.

At block 704, controller app 324 can determine whether the geolocation corresponds to a "home" location. In this context, the "home" location can correspond to a geographic area where the missing accessory is expected to be present (in the example of FIG. 1, this can include areas inside and/or near the user's home). The home location area can be defined in various ways, e.g., based on the user's travel patterns and/or a set of locations at which the missing accessory is typically visible, which can be determined dynamically as scanning is performed across time.

At block 706, if the geolocation does not correspond to the home location, then the probability of the accessory being in communication range can be set to zero (or a small nonzero value, such as 0.01, 0.001, or the like).

At block 708, controller app 324 can obtain a list of devices that were detected in one or more recent scans by Bluetooth coprocessor 304. This list can include accessories of interest as well as any other devices that were detected, regardless of whether controller 300 has ever been (or is authorized to be) connected to the device. At block 710, the list can be compared to "cluster information" for the missing accessory. The cluster information can be previously generated information identifying devices whose visibility correlates with visibility of the missing accessory; an example of generating cluster information is described below with reference to FIG. 8.

In the context of process 700, it is assumed that accessories that tend to be concurrently visible are located near each other, and consequently, the visibility of accessories that tend to be concurrently visible with a missing accessory is a reliable indicator of the likelihood that controller 300 is within signal range of the missing accessory. Accordingly, at block 712, an estimate of the probability that controller 300 is in range of the missing accessory can be generated, e.g., based on how many and/or which ones of the devices clustered with the missing accessory were detected in the scan. This probability estimate can be used at block 604 of FIG. 6. In some embodiments, a probability estimate determined using process 700 can be combined with other estimates based on other information (e.g., advertising simulations and/or prior communication with the accessory as described above) to determine an overall probability estimate.

As noted above, process 700 can exploit information about clusters of devices that tend to be visible at the same time. This can be useful, e.g., for Bluetooth LE accessories in an indoor environment. In indoor environments, the accuracy of position determination using GPS or the like tends to be significantly reduced as compared to outdoor environments. For instance, using GPS signals, controller 300 may be able to determine that it is in or near the user's house but may not be able to determine a location within the house (e.g., in the kitchen or in the living room). However, typical Bluetooth LE accessories have a range that may be smaller than the size of the house, so simply determining that controller 300 is in or near the user's house may not suffice to determine whether a particular accessory is in range. However, in some examples, it may be possible to determine an actual location of controller 300 within the house (e.g., at the front door, in the bathroom, in the kitchen, etc.). When identified, the scanning logic may be able to use the specific location of controller 300 to perform more aggressive scans for accessories and/or to automatically connect to appropriate accessories. For example, if controller 300 is identified at the front door of the house, controller 300 may automatically connect to a Bluetooth or Bluetooth LE enabled door lock or security camera. Additionally, if controller 300 is identified in the bathroom, controller 300 may automatically connect to a Bluetooth or Bluetooth LE enabled accessories in the bathroom.

In situations where accessories and/or other devices that broadcast advertisements rarely (or never) change their locations, it may be possible to determine whether controller 300 is within range of a target accessory (e.g., the "missing" accessory in processes 600 and 700) based on what other accessories or other devices are detectable by scanning. To facilitate such determinations, controller 300 can maintain "cluster" information for various accessories based on data collected during scans. For instance, each time a scan is performed, Bluetooth coprocessor 304 can generate a list of every device for which an advertisement was detected. The list can include all devices, regardless of their configuration or capabilities or whether controller 300 can connect to the device. For instance, the list can include not only accessories as described above (e.g., thermostats, lights, cameras, doors, home appliances and other accessories that use a uniform accessory protocol) but also any other devices that might be advertising, such as keyboards, mice, headphones, other mobile devices (e.g., a mobile phone belonging to the user's spouse), and so on.

Figure 8:
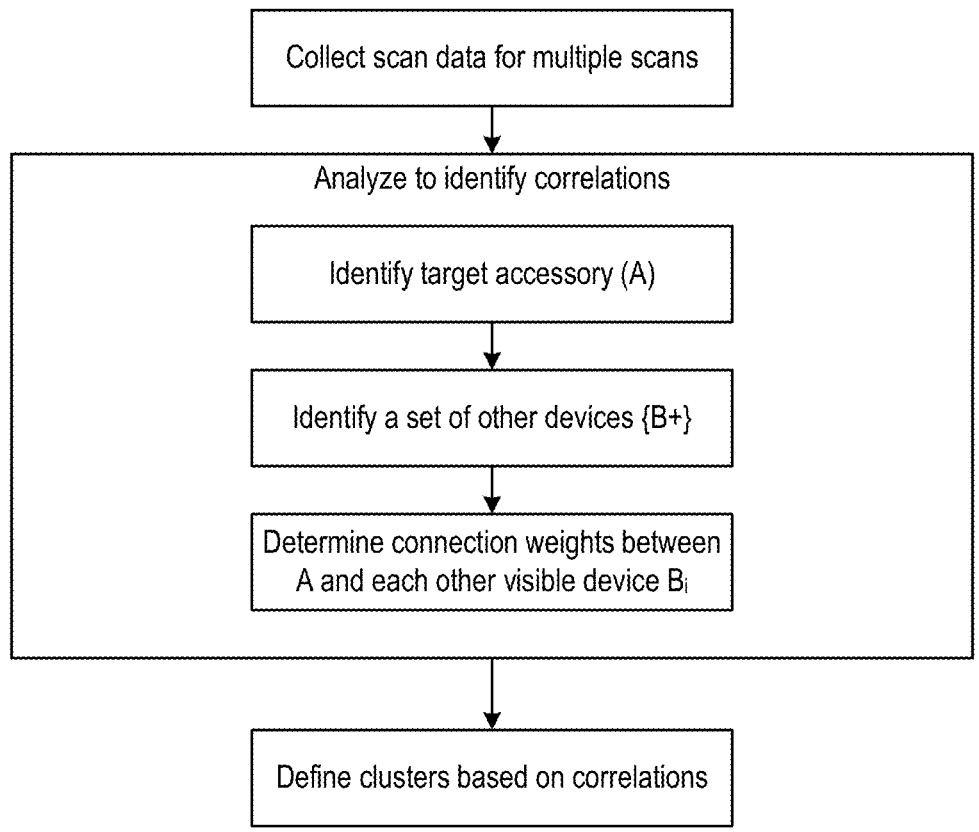
FIG. 8 shows a flow diagram of a process for generating cluster data for an accessory according to an embodiment of the present invention.

FIG. 8 shows a flow diagram of a process 800 for generating cluster data for an accessory according to an embodiment of the present invention. Process 800 can be performed, e.g., whenever Bluetooth coprocessor 304 performs a scan or for some subset of scans (e.g., on an hourly basis).

Process 800 can begin at block 802, where scan data can be collected for a number of scans. These can be contiguous (in time) scanning operations or sampling of scanning operations across some period of time (e.g., a day or a week). The time period can be selected based on real-world experience indicating how many scans are needed to provide statistical distinction between real correlations due to close proximity and accidental correlation. The optimum time period and/or n umber of scans may depend on how frequently and/or how far various devices move. Data from all of the scans that were performed during the time period being used can be included, or a data from a random subset of the scans can be used.

At block 804, the scan data can be analyzed to detect correlations. Many different algorithms can be used. In one example, at block 806, the correlation algorithm can identify a target accessory (denoted A). It is to be understood that the analysis can be repeated for any number of target accessories, and any accessory can be chosen on any iteration. At block 808, a set of other visible devices, $\{B_i\}$, can be defined, where the set $\{B_i\}$ includes all devices that were visible in at least one scan while target accessory A was visible. The set of other devices $\{B_i\}$ can include accessories and any other Bluetooth LE devices. In some embodiments, the set of other devices $\{B_i\}$ can include devices whose presence was detected on some channel other than Bluetooth LE during a time period coincident with a Bluetooth LE scan that detected target accessory A. Thus, the set of other devices $\{B_i\}$ can include any combination of Bluetooth LE devices, Bluetooth Classic devices, Wi-Fi devices (including access points), NFC devices, and so on.

At block 808, a set of connection weights, $\{W_{ABi}\}$, can be determined for target accessory A and each other device $B_i$. For example, a connection weight can be defined as:

$$W_{ABi} = N(A\&B_i)/N(A),$$

where $N(A\&B_i)$ is the number of scan events that detected both target accessory A and other device $B_i$ and $N(A)$ is the number of scan events that detected target accessory A. In this example, each weight is a number between 0 and 1.

At block 810, clusters can be defined based on the correlations detected at block 804 (e.g., the connection weights determined at block 808). In some embodiments, a device $B_i$ is added to the cluster for target accessory A if (and only if) the connection weight $W_{ABi}$ exceeds a threshold. In this case, each target accessory can have its own cluster defined, and a given device can be the target accessory A for one cluster and one of the other devices B for one or more other clusters. Here, since $W_{ABi}$ is not necessarily equal to $W_{BiA}$, it follows that just because $B_i$ is in the cluster for A, the reverse is not necessarily true. Those skilled in the art will recognize that other connection weights can be defined and that other clustering techniques (including techniques not based on connection weights) can be used to define clusters. Clustering can be repeated from time to time (e.g., daily, weekly) to capture changes in the location and/or advertising behavior of various devices.

Cluster data produced by process 800 or other clustering processes can be stored as accessory information 330 in storage subsystem 306. Process 700 can include reading the previously stored cluster data associated with a particular accessory.

In some embodiments, process 600 can be combined with process 400 to allow additional dynamic determinations of whether and how aggressively to scan. For instance, during process 400, controller app 324 can use process 600 or similar processes to determine whether controller 300 is likely at (or near) home or not, where "home" can refer to a location where accessories of interest to controller app 324 are installed. If controller 300 is not at (or near) home, then controller app 324 executing process 400 can request no scanning and can assume that all accessories of interest are not reachable by a Bluetooth LE path. (Some or all accessories of interest may be reachable by other paths.) It should be noted that even if controller app 324 requests no scanning, other processes executing on applications processor 302 might request scans, and any data gathered in such scans that might be useful to controller app 324 can be provided to controller app 324.

In some embodiments, cluster information obtained from process 800 (or similar process) can be used for other purposes, such as constructing a "floor plan" indicating the likely relative locations of various accessories or clusters. Floor plan construction can be based on clustering information and in some cases other information. For example, changes detected in the set of visible clusters or devices as controller 300 moves may be used to infer relative locations of devices and/or clusters, and this information may facilitate various automatic operations or predictive logic in controller app 324 to determine, given movement patterns of controller 300, which accessory a user might next attempt to interact with via controller 300. Clustering and floor plan generation can be automatically performed and completely transparent to the user.

Example Dynamic Path Selection

Using various combinations of the processes of FIGS. 4-8, controller 300 can update reachability data for various accessories to indicate whether each accessory is or is not currently considered reachable using Bluetooth LE. As noted above, some accessories may have multiple possible connection paths to a controller (e.g., Bluetooth LE, Wi-Fi LAN, tunnel, wide area network), and reachability data for each possible connection path can be separately updated. Different procedures can be used to update different possible connection paths. For instance, in the case of a Wi-Fi LAN, the controller can query an access point to find out which accessories are connected to the LAN. In the case of a tunnel path, the controller can determine whether the tunnel is visible (e.g., on a Wi-Fi LAN) and whether the tunnel indicates that the accessory is connected or reachable via the tunnel. In the case of a wide area network path, the controller can determine whether the accessory is configured for a wide area network communication mode, e.g., whether the accessory and the controller have a remote pairing on a secure relay service. The possible paths are not limited to these examples. For instance, in some embodiments, a controller and accessory may communicate using ad-hoc Wi-Fi networking techniques that allow two devices to establish a direct connection without using an access point. In that case (or for any other direct point-to-point communication path), dynamically adaptable scanning techniques similar to those described herein can be used to determine reachability for the path.

Figure 9:
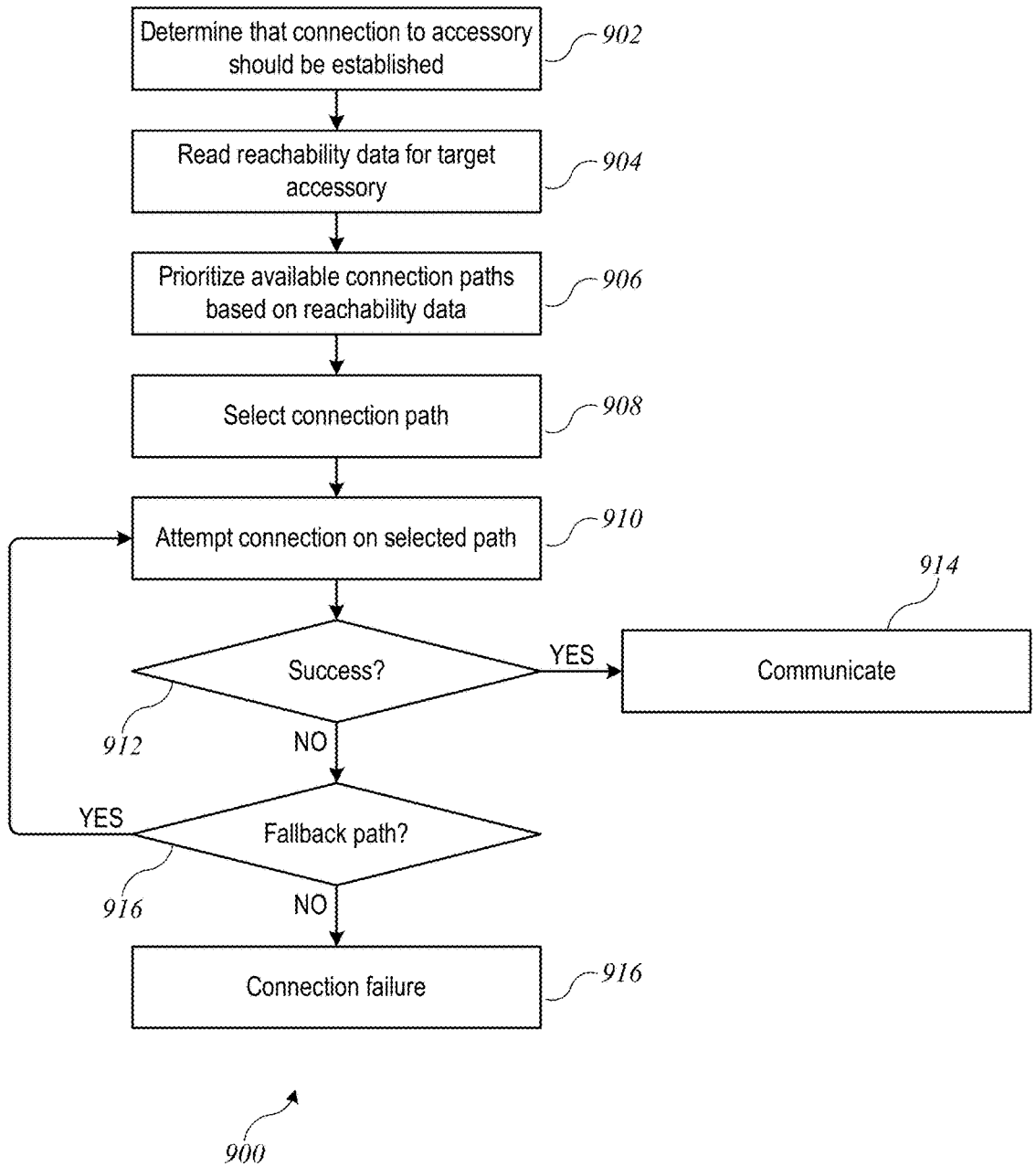
FIG. 9 shows a flow diagram of a process for establishing a connection between a controller and an accessory according to an embodiment of the present invention.

In some embodiments, reachability data can be used to facilitate the process of connecting to an accessory when a connection is desired. For instance, the controller may be able to reduce the time spent determining which of the possible paths to use by using previously established reachability information for the accessory. FIG. 9 shows a flow diagram of a process 900 for establishing a connection between a controller and an accessory according to an embodiment of the present invention. Process 900 can be performed by a controller, e.g., controller 300 of FIG. 3.

Process 900 can begin at block 902, when controller 300 determines that a connection to a particular "target" accessory should be established. For instance, controller app 324 may receive user input indicating an operation to be performed on an accessory (e.g., unlock door 104 or turn on light 108). As another example, controller app 324 may execute automatically triggered actions in response to some condition detected by controller 300 (e.g., at 10:00 pm, decrease the target temperature of thermostat 112 to 65 degrees). As yet another example, controller app 324 may execute predictive logic to determine that the user is likely to want to communicate with a particular accessory. For instance, assuming that controller 300 can determine when the user is arriving at home, controller app 324 may predict that the user will request to unlock door 104 and may prepare a connection to door 104 in anticipation of the request.

At block 904, controller app 324 can read the stored reachability data for the target accessory from storage subsystem 306. As described above, the reachability data can indicate which of the possible connection paths are currently available. In some embodiments, the reachability data may include additional path-specific information, such as a signal strength for the path to the target accessory. Signal strength can be determined, e.g., from the strength of the advertisement signal measured during a scanning operation. Signal strength can be measured using conventional Bluetooth RSSI (received signal strength indication) or other measures and scales. Signal strength for other paths can also be determined similarly.

At block 906, controller app 324 can prioritize the available connection paths based on the reachability data, and at block 908 the highest-priority path can be selected. Various prioritization rules and algorithms can be implemented.

For example, one prioritization algorithm can assign a different priority ranking to each possible path. Thus, if the possible paths are direct (Bluetooth LE), tunnel, and remote, they can be ranked in that order. Accordingly, if the accessory is reachable on Bluetooth LE, that path would be selected.

In some embodiments, prioritization at block 906 can incorporate RSSI or other signal strength measurements. For instance, as shown in FIG. 2, controller 202(1) has both a direct path and a tunnel path to accessory 204(3). In this case, controller 202(1) can compare the signal strengths between the direct path and the tunnel path and choose the stronger signal. In another example, controller 202(1) can place a threshold on the RSSI of the direct path and can prefer the tunnel path unless the RSSI of the direct path exceeds the threshold. This may result in controller 202(1) using the tunnel path most of the time and only using the direct path when in close proximity to accessory 204(3).

Other prioritization schemes can also be used. For instance, if a path via a coordinator (as described above) is available, that path may be the highest priority path.

Regardless of the prioritization rules or which path is selected, at block 910, controller 300 can attempt to connect to the target accessory using the selected path. If, at block 912, the connection attempt succeeds, then at block 914, controller 300 can begin to communicate with the target accessory using that path.

If the attempt fails, then at block 916, process 900 can determine whether a fallback path is available. The fallback path can be another possible path that is currently flagged as reachable. In some embodiments, prioritization at block 906 can rank all possible paths, and fallback paths can be selected successively in order of their rankings. If a fallback path is available, process 900 can return to block 910 to attempt a connection on the fallback path. Every available path can be tried in turn until either success is achieved or the set of available paths is exhausted. In the latter case, process 900 can end with a connection failure at block 918. In some embodiments, controller 300 can alert the user to the failure, and the user may be able to take corrective action (e.g., resetting the accessory, changing a battery, moving the accessory or an obstacle that may be blocking wireless signals, etc.).

Depending on circumstances, there may also be cases where the reachability information at block 904 indicates that no path to the accessory is currently available. This can be treated as a connection failure case, similarly to block 918.

Process 900 is illustrative, and variations and modifications are possible. It should be noted that all of the reachability data for an accessory (including signal strength information where used) can be gathered in advance of executing process 900, e.g., using the dynamically adjustable scanning processes described above or similar processes. Since the prioritizing logic can operate according to fixed rules using stored reachability information, decisions as to which path to attempt can be made very quickly. This can allow for faster response to user input and less perceived delay.

Further Embodiments

While the invention has been described with respect to specific embodiments, one skilled in the art will recognize that numerous modifications are possible. Controllers and accessories can communicate using a variety of channels and transports, and techniques described herein with reference to a Bluetooth LE channel can be adapted to other channels, including Bluetooth Classic, Wi-Fi, and other wireless channels.

In some embodiments, a controller may sometimes operate using battery power (which is limited, in the sense that the battery can be drained to the point where the controller ceases to operate) or external power (e.g., power provided by a cable plugged into a wall outlet, which can be regarded as unlimited). The controller can modify its behavior depending on the power source; for instance, a controller may scan more aggressively (e.g., with higher duty cycle) when plugged into a wall outlet or may enter sleep state less often.

Further, while the foregoing description may make reference to certain operations and/or activities being performed in an applications processor or a coprocessor, it is to be understood that this is not required. For instance, scanning parameter determination and/or filtering based on scanning results can be performed entirely or partially within an applications processor or main processor of a controller instead of in a communications coprocessor. As another example, in some embodiments described above, a process on the applications processor makes the determination whether to scan more aggressively for a missing accessory, and the communications coprocessor can wake the applications processor in the event of a missing accessory to allow the applications processor to make the determination regarding further scanning. In other embodiments, this determination can be made within the communications coprocessor, and the applications processor can remain asleep. This may provide additional power saving.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method, comprising:
   identifying, by a controller device, a missing accessory associated with a location;
   receiving, by the controller device, information that identifies a first plurality of accessories detected on a previous scan associated with the location;
   comparing, by the controller device, the information that identifies the first plurality of accessories to cluster information that identifies a second plurality of accessories;
   determining, by the controller device, a probability of the controller device being within communication range of the missing accessory based at least in part on the comparison; and
   in accordance with a determination that the probability is above a threshold, modifying, by the controller device, a communication connection with the missing accessory.

2. The method of claim 1, wherein modifying the communication connection with the missing accessory comprises selecting a communication connection path between the controller device and the missing accessory.

3. The method of claim 1, further comprising ranking a plurality of different communication connection paths between the controller device and the missing accessory.

4. The method of claim 3, further comprising attempting to connect to the missing accessory using a highest priority communication connection path of the plurality of different communication connection paths.

5. The method of claim 4, further comprising attempting to connect to the missing accessory using a second highest priority communication connection path of the plurality of different communication connection paths in accordance with a determination that the attempt to connect to the missing accessory using the highest priority communication connection path was unsuccessful.

6. The method of claim 1, further comprising generating the cluster information based at least in part on connection weights for each accessory detected during a scan for accessories associated with the location.

7. The method of claim 6, wherein the second plurality of accessories are determined to be related to one another based at least in part on the connection weights.

8. The method of claim 1, further comprising:
   identifying, by the controller device, location data for the controller device;
   determining, by the controller device, whether the location data corresponds to an account of the controller device; and
   determining, by the controller device, the probability in accordance with a determination that the location data corresponds to the account of the controller device.

9. A controller device, comprising:
   a memory configured to store computer-executable instructions; and
   one or more processors in communication with the memory and configured to execute the computer-executable instructions to at least:
   identify a missing accessory associated with a location;
   receive information that identifies a first plurality of accessories detected on a previous scan associated with the location;
   compare the information that identifies the first plurality of accessories to cluster information that identifies a second plurality of accessories;
   determine a probability of the controller device being within communication range of the missing accessory based at least in part on the comparison; and
   in accordance with a determination that the probability is above a threshold, modify a communication connection with the missing accessory.

10. The controller device of claim 9, wherein the missing accessory is identified as the missing accessory based at least in part on the missing accessory being detected in at least one previous scan but not being connected to the controller device.

11. The controller device of claim 9, wherein the previous scan is a most recent scan for accessories associated with the location.

12. The controller device of claim 9, wherein modifying the communication connection with the missing accessory comprises selecting a communication connection path between the controller device and the missing accessory.

13. The controller device of claim 9, wherein the one or more processors are further configured to at least:
rank a plurality of different communication connection paths between the controller device and the missing accessory;
attempt to connect to the missing accessory using a highest priority communication connection path of the plurality of different communication connection paths; and
attempt to connect to the missing accessory using a second highest priority communication connection path of the plurality of different communication connection paths in accordance with a determination that the attempt to connect to the missing accessory using the highest priority communication connection path was unsuccessful.

14. The controller device of claim 9, wherein the one or more processors are further configured to at least generate the cluster information based at least in part on connection weights for each accessory detected during a scan for accessories associated with the location.

15. The controller device of claim 14, wherein the second plurality of accessories are determined to be related to one another based at least in part on the connection weights.

16. A non-transitory computer-readable storage medium storing computer-executable instructions that, when executed by a controller device, configure the controller device to perform operations comprising:
identifying a missing accessory associated with a location;
receiving information that identifies a first plurality of accessories detected on a previous scan associated with the location;
comparing the information that identifies the first plurality of accessories to cluster information that identifies a second plurality of accessories;
determining a probability of the controller device being within communication range of the missing accessory based at least in part on the comparison; and
in accordance with a determination that the probability is above a threshold, modifying a communication connection with the missing accessory.

17. The non-transitory computer-readable storage medium of claim 16, wherein modifying the communication connection with the missing accessory comprises selecting a communication connection path between the controller device and the missing accessory.

18. The non-transitory computer-readable storage medium of claim 16, wherein the operations further comprise:
ranking a plurality of different communication connection paths between the controller device and the missing accessory;
attempting to connect to the missing accessory using a highest priority communication connection path of the plurality of different communication connection paths; and
attempting to connect to the missing accessory using a second highest priority communication connection path of the plurality of different communication connection paths in accordance with a determination that the attempt to connect to the missing accessory using the highest priority communication connection path was unsuccessful.

19. The non-transitory computer-readable storage medium of claim 16, wherein the operations further comprise generating the cluster information based at least in part on connection weights for each accessory detected during a scan for accessories associated with the location.

20. The non-transitory computer-readable storage medium of claim 19, wherein the second plurality of accessories are determined to be related to one another based at least in part on the connection weights.

* * * * *